United States Patent
Mogi et al.

(10) Patent No.: US 6,796,287 B2
(45) Date of Patent: Sep. 28, 2004

(54) INTERNAL COMBUSTION ENGINE UTILIZING MOTOR TO CHANGE OVER COMPRESSION RATIO AND CONTROL METHOD OF INTERNAL COMBUSTION ENGINE

(75) Inventors: Kazuhisa Mogi, Susono (JP); Shigeki Miyashita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/763,229

(22) Filed: Jan. 26, 2004

(65) Prior Publication Data

US 2004/0153234 A1 Aug. 5, 2004

(30) Foreign Application Priority Data

Jan. 29, 2003 (JP) ........................................ 2003-020351

(51) Int. Cl.[7] ............................................. F02D 13/00
(52) U.S. Cl. ......................................... 123/319; 123/395
(58) Field of Search ................................ 123/395, 319, 123/402, 403, 363

(56) References Cited

U.S. PATENT DOCUMENTS 6,662,768 B2 * 12/2003 Boyer et al. .............. 123/78 E

FOREIGN PATENT DOCUMENTS

| JP | A 62-258153 | 11/1987 |
|---|---|---|
| JP | A 63-159642 | 7/1988 |
| JP | U 64-56537 | 4/1989 |
| JP | Y2 2510247 | 6/1996 |
| JP | A 2000-69609 | 3/2000 |
| JP | A 2001-45609 | 2/2001 |

* cited by examiner

Primary Examiner—Bibhu Mohanty
(74) Attorney, Agent, or Firm—Oliff & Berridge, PLC

(57) ABSTRACT

An internal combustion engine is capable of changing a compression ratio according to an output torque. A motor is connected with an output shaft of the internal combustion engine to transmit torque to and from the output shaft. The internal combustion engine detects a torque demand required to the internal combustion engine. When the torque demand exceeds a threshold torque, which is set in advance for changeover of setting of the compression ratio in the internal combustion engine, the motor is controlled to output a torque to the output shaft. The torque output from the motor restricts the output torque of the internal combustion engine to be not greater than the threshold torque. Such control effectively prevents frequent changeover of the setting of the compression ratio in the internal combustion engine. This arrangement desirably saves energy required for the frequent changeover of the compression ratio and thus enhances the total efficiency of the internal combustion engine. This arrangement also keeps the operator of the internal combustion engine free from the sense of discomfort. The motor is capable of a quick increase of the output torque. The motor thus instantly increases the output torque, in response to an increase in torque demand.

19 Claims, 12 Drawing Sheets

INTERNAL COMBUSTION ENGINE UTILIZING MOTOR TO CHANGE OVER COMPRESSION RATIO AND CONTROL METHOD OF INTERNAL COMBUSTION ENGINE

BACKGROUND OF THE INVENTION

1. Field of the Invention

The present invention relates to a technique of adequately changing over the setting of compression ratio in an internal combustion engine with a variable compression ratio.

2. Description of the Related Art

The internal combustion engine is small in size but is capable of outputting relatively large power. Because of these advantages, the internal combustion engine is widely used as the power source of various transportations including automobiles, boats and ships, and aircraft, and as the power source of diverse stationary equipment and machinery. The principle of the internal combustion engine makes the compressed air-fuel mixture subjected to combustion in a combustion chamber and converts the pressure of combustion into mechanical power.

In the internal combustion engine, the higher compression ratio, which represents the ratio of compression of the air-fuel mixture, theoretically enhances the thermal efficiency. In the actual state, however, the higher compression ratio undesirably heightens the potential for the occurrence of abnormal combustion called knocking. Driving the internal combustion engine in the state of knocking may damage the internal combustion engine. In the internal combustion engine with setting of a high compression ratio, especially in a driving area of high load having the high potential for the occurrence of knocking, the ignition timing is delayed from its optimum timing to prevent the occurrence of knocking. The delayed ignition timing effectively prevents the occurrence of knocking but naturally lowers the output of the internal combustion engine.

Various techniques of changing the compression ratio set in the internal combustion engine have been proposed by taking into account these findings. Some of these techniques are disclosed in, for example, JAPANESE PATENT LAID-OPEN GAZETTE No. 62-258153 and No. 63-159642. The technique described in these cited references changes over the setting of the compression ratio according to the driving conditions of the internal combustion engine. The control procedure sets a high compression ratio in the driving conditions of low and medium load having the low potential for the occurrence of knocking, while setting a low compression ratio in the driving conditions of high load having the high potential for the occurrence of knocking. The internal combustion engine is driven at the high compression ratio in the driving area of low and medium load. This attains the high thermal efficiency. The internal combustion engine is driven at the low compression ratio in the driving area of high load. This assures a large output of the internal combustion engine while preventing the occurrence of knocking.

The changeover of the compression ratio set in the internal combustion engine enables the simultaneous improvement of the thermal efficiency and the maximum output, but has the drawbacks discussed below. The changeover of the setting of the compression ratio in the internal combustion engine requires some energy. Frequent changeover of the compression ratio undesirably consumes large energy and may lower the total thermal efficiency of the internal combustion engine. The changeover of the setting of the compression ratio also takes some time. Frequent changeover of the compression ratio may give the sense of discomfort to the operator of the internal combustion engine. The simple changeover of the compression ratio varies the output of the internal combustion engine and may give the sense of discomfort to the operator of the internal combustion engine. The complicated control strategy is thus required to prevent the variation in output of the internal combustion engine. A technique of eliminating such drawbacks has highly been demanded.

SUMMARY OF THE INVENTION

The object of the invention is thus to eliminate the drawbacks of the prior art techniques without damaging the advantages of an internal combustion engine with a variable compression ratio.

The invention is directed to an internal combustion engine and a control method of the internal combustion engine, in order to attain at least part of the above and the other related objects. The control technique of the invention detects a torque demand required to an output shaft of the internal combustion engine and compares the detected torque demand with the threshold torque a threshold torque, which is set in advance for changeover of setting of the compression ratio in the internal combustion engine. The control technique distributes the torque demand into a first torque value to be transmitted between the motor and the output shaft and a second torque value to be output from the internal combustion engine, based on a result of the comparison. The control technique also specifies a desired setting of the compression ratio, based on the result of the comparison. The control technique then changes over the setting of the compression ratio in the internal combustion engine according to the specification of the desired setting of the compression ratio, while controlling the motor to regulate torque transmission between the motor and the output shaft according to the first torque value. This arrangement sets the appropriate compression ratio in the internal combustion engine and drives the internal combustion engine to output the required torque.

One preferable application distributes the torque demand in such a manner as to reduce a frequent change of the torque division to be output from the internal combustion engine across the preset threshold torque, in response to a variation in detected torque demand. The setting of the compression ratio in the internal combustion engine is not changed over, when the torque demand only slightly exceeds the threshold torque. Such control effectively prevents frequent changeover of the setting of the compression ratio in the internal combustion engine. This arrangement desirably saves energy required for the frequent changeover of the compression ratio and thus enhances the total efficiency of the internal combustion engine. This arrangement also keeps the operator of the internal combustion engine free from the sense of discomfort.

The changeover of the compression ratio takes some time. It is accordingly difficult to quickly increase the output torque of the internal combustion engine by changing over the compression ratio, in response to an increase in torque demand. The control of increasing the output torque of the motor without changing over the compression ratio, on the other hand, advantageously responds to the increase in torque demand.

In the internal combustion engine and the corresponding control method, one preferable embodiment stores a control area to specify setting of the compression ratio in the internal combustion engine and state of torque output from the motor to the output shaft, corresponding to at least the torque demand required to the output shaft, and gives an instruction to change over the compression ratio and control the motor according to the specification of the control area. It is preferable that multiple control areas are stored, which include at least a first control area to specify setting of a predetermined compression ratio in the internal combustion engine and selection of no torque output as the first torque value, corresponding to a range of lower torque demand than the threshold torque, and a second control area to specify setting of the predetermined compression ratio in the internal combustion engine and selection of the first torque value, corresponding to a range of higher torque demand than the threshold torque.

When the torque demand exceeds the threshold torque, the motor is controlled to output the torque according to the specification of the control area. Such control restricts the output torque of the internal combustion engine to be not greater than the threshold torque. This arrangement effectively prevents frequent changeover of the compression ratio.

The above embodiment may further store a third control area to specify setting of a lower compression ratio than the predetermined compression ratio in the internal combustion engine, corresponding to a range of higher torque demand than the torque demand range of the second control area. The control may depend upon accumulation of electric power, which is supplied to the motor. When the observed amount of power accumulation is not greater than a preset threshold value, the control procedure gives an instruction to change over the setting of the compression ratio in the internal combustion engine and control the motor according to the specification of the third control area, in response to the detected torque demand even belonging to the second control area.

In the insufficient state of charge, the compression ratio set in the internal combustion engine is lowered to increase the output torque of the internal combustion engine. This desirably reduces the output torque of the motor and the power consumption.

In the internal combustion engine and the corresponding control method, another preferable embodiment counts elapse of a preset time after the detected torque demand exceeds the threshold torque. The control procedure controls the motor to output an increased torque from the motor to the output shaft until the torque demand exceeding the threshold torque continues for the preset time. When the torque demand exceeding the threshold torque continues for the preset time, the control procedure changes over the setting of the compression ratio in the internal combustion engine to increase the output torque of the internal combustion engine, while controlling the motor to decrease the output torque from the motor to the output shaft.

When the torque demand exceeds the threshold torque only for a shorter time than the preset time, the control procedure does not change over the setting of the compression ratio in the internal combustion engine but increases the output torque of the motor. This arrangement effectively prevent frequent changeover of the setting of the compression ratio. When the torque demand exceeding the threshold torque continues for or over the preset time, on the other hand, the control procedure changes over the setting of the compression ratio in the internal combustion engine to increase the output torque of the internal combustion engine, while decreasing the output torque of the motor. This desirably reduces the power consumption.

When the observed amount of power accumulation is not greater than a preset threshold value, the control procedure may change over the setting of the compression ratio in the internal combustion engine to increase the output torque of the internal combustion engine, while decreasing the output torque of the motor before elapse of the preset time, for example, after elapse of a shorter time than the preset time or immediately after the torque demand exceeds the threshold torque. The preset time may be regulated according to the state of charge.

This arrangement effectively reduces the power consumption in the insufficient state of charge.

At least part of the object discussed above and the other related objects is also attained by another internal combustion engine and a control method of the internal combustion engine. The control technique regulates torque transmission between the motor and the output shaft in the course of changeover of the compression ratio set in the internal combustion engine, and thereby reduces a variation in output torque of the internal combustion engine to be not greater than a predetermined level. This arrangement implements changeover of the compression ratio without giving the sense of discomfort to the operator of the internal combustion engine.

In this internal combustion engine of the invention and the corresponding control method, one embodiment controls a driving state of the internal combustion engine with setting of a control amount unchanged in the course of the changeover of the compression ratio. Here the setting of the control amount is fixed to a specific control amount corresponding to the higher compression ratio between a previous compression ratio before the changeover and a new compression ratio after the changeover.

The higher compression ratio generally heightens the potential for the occurrence of abnormal combustion called knocking in the internal combustion engine. The compression ratio is changed over, while the setting of the control amount of the internal combustion engine is fixed to the specific control amount corresponding to the higher compression ratio between those before and after the changeover. This effectively prevents the occurrence of knocking in the course of the changeover.

In this internal combustion engine of the invention and the corresponding control method, the control procedure may change over the compression ratio, while the setting of the control amount of the internal combustion engine is fixed to a specific control amount corresponding to a high compression ratio in the course of changeover from the high compression ratio to a low compression ratio.

This arrangement only requires storage of the previous setting of the control amount during the changeover of the compression ratio, thus advantageously simplifying the control procedure.

These and other objects, features, aspects, and advantages of the present invention will become more apparent from the following detailed description of the preferred embodiment with the accompanying drawings.

DESCRIPTION OF THE PREFERRED EMBODIMENTS

Figure 1:
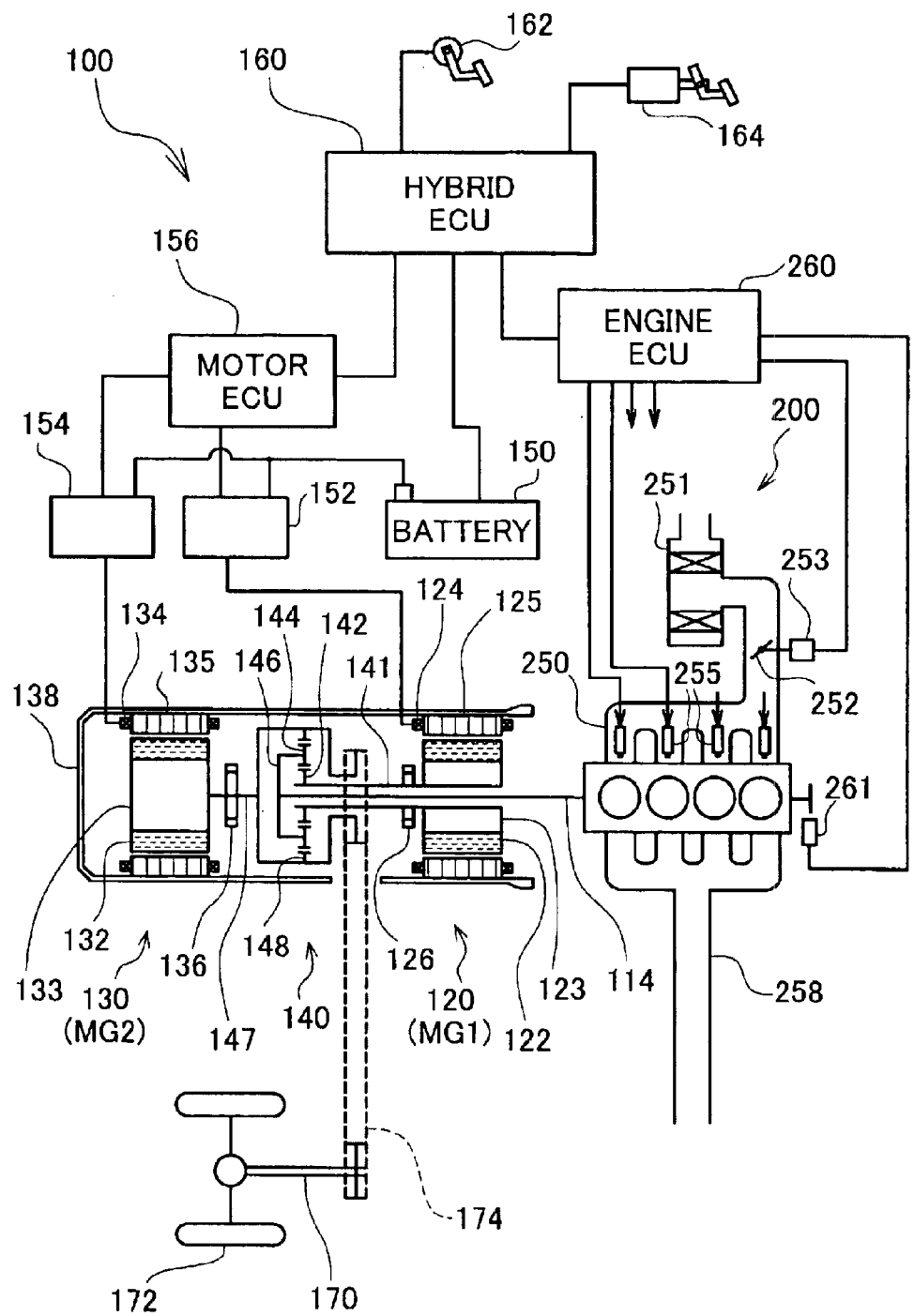
FIG. 1 schematically illustrates the structure of a hybrid vehicle with an internal combustion engine of the invention mounted thereon.

Some embodiments of the invention are discussed below in the following sequence:

A. System Construction
   A-1. Structure of Hybrid Vehicle
   A-2. Outline of Operations of Hybrid Vehicle
   A-3. Structure of Engine with Variable Compression Ratio
B. Drive Control of First Embodiment
C. Drive Control of Second Embodiment
D. Drive Control of Third Embodiment
A. System Construction
A-1. Structure of Hybrid Vehicle FIG. 1 schematically illustrates the structure of a hybrid vehicle 100 embodying the invention. As illustrated, the hybrid vehicle 100 has a motor generator MG1 (120), another motor generator MG2 (130), and an engine 200, where the engine 200 and the two motor generators MG1 and MG2 are mutually coupled via a planetary gear 140. As described later in detail, the engine 200 is a variable compression-ratio engine that has a variable compression ratio according to driving conditions. The engine 200 is mainly used as a power source in the hybrid vehicle 100. Each of the motor generators MG1 and MG2 functions both as a power source that utilizes electric energy to generate a driving force and as a generator that is driven by an external force to generate electric energy. The motor generator MG1 is mainly used as the generator, whereas the motor generator MG2 is mainly used as the power source. The planetary gear 140 functions to transmit the output from the engine 200 and the motor generator MG2 to drive wheels 172 via a chain belt 174 and an axle 170. The planetary gear 140 also has a power distribution function to divide the output from the engine 200 to the motor generator MG1 and the drive wheels 172. The planetary gear 140 also functions as a transmission to reduce or accelerate revolution speed of the motor generator MG2 or the engine 200 and to transmit the reduced or accelerated revolution speed to the drive wheels 172.

The engine 200 has four combustion chambers. An air-fuel mixture of the air and a fuel is subjected to combustion in each of the four combustion chambers to generate power. The engine 200 compresses the air-fuel mixture sucked into the combustion chamber, makes the compressed air-fuel mixture subjected to combustion, converts the pressure of the combustion into power, and outputs the power. The operations of the engine 200 are under control of an electronic control unit for engine control (hereafter referred to as engine ECU) 260. The engine 200 is capable of varying a compression ratio, which represents the ratio of compression of the air-fuel mixture, according to the driving conditions. The detailed structure of the engine 200 will be discussed later.

The planetary gear 140 has a sun gear 142 that is located on a center, a ring gear 148 that is concentrically arranged outside the sun gear 142, multiple planetary pinion gears 144 that are interposed between the sun gear 142 and the ring gear 148 to rotate and revolve around the sun gear 142, and a planetary carrier 146 that is linked with an end of a crankshaft 114 of the engine 200 and supports rotational axes of the respective planetary pinion gears 144. The sun gear 142 is connected with a rotor 123 of the motor generator MG1 via a sun gear shaft 141, whereas the ring gear 148 is connected with a rotor 133 of the motor generator MG2 via a ring gear shaft 147. The planetary carrier 146 is coupled with the crankshaft 114 of the engine 200.

The three shafts, the sun gear shaft 141, the ring gear shaft 147, and the crankshaft 114, function as power input-output shafts of the planetary gear 140 having the above structure. Specification of powers input to and output from any two shafts among these three shafts automatically determines power input to and output from residual one shaft. The chain belt 174 is linked with the ring gear 148. The power is transmitted to the drive wheels 172 via the chain belt 174 and the axle 170 to drive the hybrid vehicle 100.

The motor generator MG1 is an AC synchronous motor and has a rotor 123 with multiple permanent magnets 122 attached to an outer circumference thereof and a stator 125 with three-phase coils 124 wounded thereon to form a rotating magnetic field. The stator 125 of the motor generator MG1 is fixed to a casing 138, while the rotor 123 is coupled with the sun gear shaft 141 of the planetary gear 140 described above. A resolver 126 is mounted on the sun gear shaft 141 to measure a rotational angle of the rotor 123. The motor generator MG1 is connected to a motor ECU 156 via an inverter 152. The motor ECU 156 regulates the inverter 152 and causes the battery 150 to supply an appropriate value of alternating current to the three-phase coils 124 at an adequate frequency, thereby controlling the operations of the motor generator MG1.

Like the motor generator MG1, the motor generator MG2 is an AC synchronous motor and has a rotor 133 with multiple permanent magnets 132 attached to an outer circumference thereof and a stator 135 with three-phase coils 134 wounded thereon to form a rotating magnetic field. The rotor 133 of the motor generator MG2 is coupled with the ring gear shaft 147 of the planetary gear 140, while the stator 135 is fixed to a casing 138. A resolver 136 is mounted on the ring gear shaft 147 to measure a rotational angle of the rotor 133. The motor generator MG2 is connected to the motor ECU 156 via an inverter 154. The motor ECU 156 regulates the inverter 154 to control the operations of the motor generator MG2.

A hybrid ECU 160 mounted on the hybrid vehicle 100 takes charge of control of the whole hybrid vehicle 100. The hybrid ECU 160 is a known microcomputer including a CPU, a RAM, a ROM, an A-D converter, a D-A converter, and a timer, which are mutually connected via a bus in a data transmittable manner. The hybrid ECU 160 receives various pieces of information from an accelerator position sensor 162, a brake switch 164, and a battery 150 and determines driving conditions of the whole hybrid vehicle 100. The engine ECU 260 and the motor ECU 156 respectively control the operations of the engine 200 and the operations of the motor generators MG1 and MG2, based on the predetermined driving conditions.

A-2. Outline of Operations of Hybrid Vehicle

The following describes the principle of operations of the hybrid vehicle 100 having the above construction, especially the functions of the planetary gear 140. In the planetary gear 140, specification of powers (that is, combinations of revolution speed and torque) input to and output from any two shaft among the three shafts, that is, the sun gear shaft 141, the ring gear shaft 147, and the crankshaft 114, determines power (that is, a combination of revolution speed and torque) input to and output from residual one shaft. The relation between the revolution speed and the torque input to and output from these three shafts is readily determined by referring to an alignment chart.

Figure 2A:
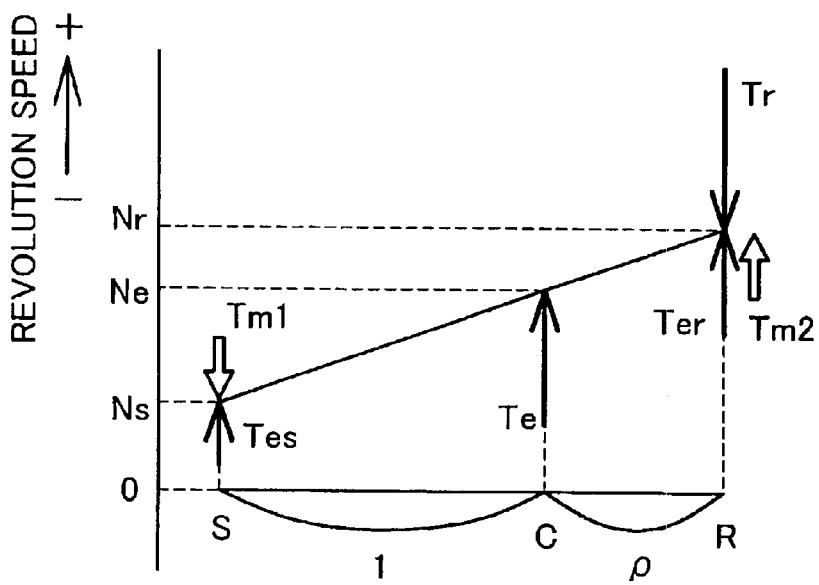
FIGS. 2(a) and 2(b) are alignment charts showing the relation between the output power of an engine and the output powers of two motor generators.

FIG. 2(a) is an alignment chart showing the revolution speeds and rotating directions of the respective gears linked with the three shafts of the planetary gear 140. The revolution speeds of the sun gear 142, the ring gear 148, and the planetary carrier 146, that is, the revolution speeds of the engine 200, the motor generator MG2, and the motor generator MG1, are plotted as ordinate, and the gear ratios of the respective gears 142, 148, and 146 are plotted as abscissa. A coordinate axis C corresponding to the planetary carrier 146 is given as a point internally dividing coordinate axes S and R of the sun gear 142 and the ring gear 148 at 1 to p, where p denotes a ratio of the number of teeth of the sun gear 142 to the number of teeth of the ring gear 148.

The revolution speed of the planetary carrier 146 or the engine 200 and the revolution speed of the ring gear 148 or the motor generator MG2 are respectively set equal to Ne and Nr. The procedure plots the revolution speed Ne on the coordinate axis C corresponding to the planetary carrier 146 and the revolution speed Nr on the coordinate axis R corresponding to the ring gear 148 in the alignment chart of FIG. 2(a) and connects these plots with a straight line. The revolution speed Ns of the sun gear 142 or the motor generator MG1 is determined as the coordinate of an intersection of this straight line with the coordinate axis S corresponding to the sun gear 142. This straight line is called the operational line. As long as the revolution speeds of any two of the three gears, the planetary carrier 146, the ring gear 148, and the sun gear 142, are known, the revolution speed of residual one gear is determinable by plotting the two coordinate points of the known revolution speeds in the alignment chart and connecting these plots with the operational line. When the ring gear 148 connecting with the axle 170 is to be rotated at a preset revolution speed, the revolution speed of the planetary carrier 146 (that is, the revolution speed of the engine 200) is arbitrarily selectable based on the revolution speed of the sun gear 142 linked with the motor generator MG1.

The torques input to and output from the three shafts of the planetary gear 140 are discussed below. In order to specify torques in the alignment chart, the operational lines are regarded as rigid bodies, and the torques as the forces acting on the rigid bodies. For example, it is assumed that the engine 200 generates a torque Te and that a torque Tr is to be output from the drive wheels 172. The torque output from the drive wheels 172 appears as a reactive torque Tr acting on the coordinate axis R on the operational line.

The torque Te is applied upward onto the operational line at the position of the coordinate axis C. The torque Te is distributed to the coordinate axis S and the coordinate axis R as shown in FIG. 2(a). A torque division Tes acting on the coordinate axis S and a torque division Ter acting on the coordinate axis R are respectively expressed as:

$$Tes = Tep/(1+p) \tag{12}$$

$$Ter = Te/(1+p) \tag{2}$$

Here it is assumed that the torque Tr is to be output from the drive wheels 172. Since there is the torque division Ter from the engine 200, the motor generator MG2 is required to output a deficiency of torque (Tr−Ter). This is explainable from the viewpoint of the torque balance on the operational line. The output of the torque Tr from the drive wheels 172 causes the reactive torque Tr to be applied at the position of the coordinate axis R on the operational line. In order to balance the torque division Ter from the engine 200, the reactive torque Tr, and the output torque of the motor generator MG2, a torque Tm2 to be output from the motor generator MG2 is determined as Tm2=Tr−Ter.

A torque Tm1 to be output from the motor generator MG1 is determined by taking into account the torque balance on the coordinate axis S. There is only the torque division Tes from the engine 200 acting on the coordinate axis S. The motor generator MG1 is thus required to output a torque of the identical scalar and the opposite direction. In the alignment charts of FIGS. 2(a) and 2(b), the torques output from the respective motor generators MG1 and MG2 are shown by open arrows.

As shown in the alignment chart of FIG. 2(a), the rotating direction of the motor generator MG1 is opposite to the direction of the torque Tm1 on the coordinate axis S. This means that the motor generator MG1 functions as the generator. The rotating direction of the motor generator MG2 is identical with the direction of the torque Tm2 on the coordinate axis R. This means that the motor generator MG2 functions as the motor. In the working conditions specified in the alignment chart of FIG. 2(a), the motor generator MG2 consumes electric power while the motor generator MG1 generates electric power. The working conditions of FIG. 2(a) are only illustrative. But there is a certain relation between the revolution speeds and the torques of the motor generators MG1 and MG2 specified by the operational line. In the general driving conditions, the motor generator MG2 just consumes the electric power generated by the motor generator MG1. The planetary gear 140 and the motor generators MG1 and MG2 accordingly have the functions of torque conversion. Here it is assumed that the combination of the torque Tr and the revolution speed Nr is to be output from the ring gear 148. The engine 200 is then to be driven with a combination of revolution speed and torque giving a power, which is equivalent to the required power (=revolution speed Np×torque Tr). The functions of the planetary gear 140 and the motor generators MG1 and MG2 convert the combination of the revolution speed and the torque of the engine 200 into the combination of the revolution speed Nr and the torque Tr, which is to be output from the ring gear 148. Here the power represents power or output energy per unit time.

Figure 2B:
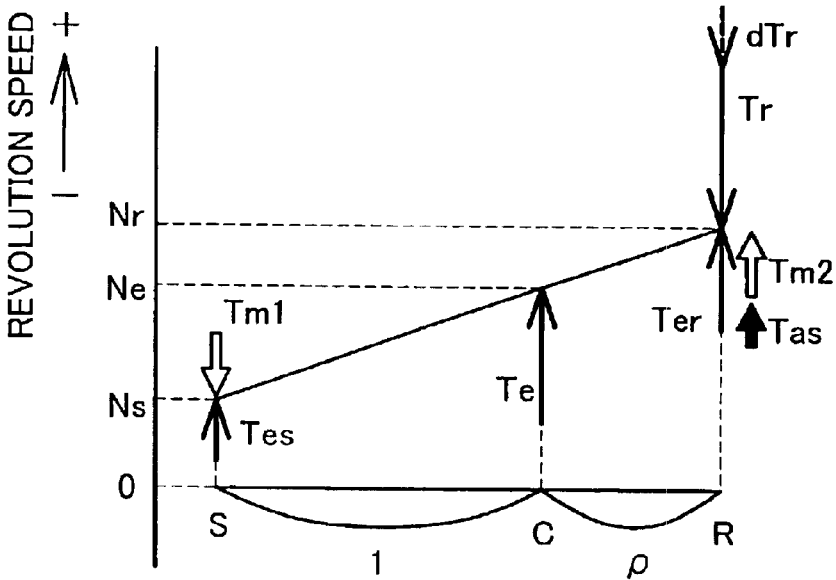

The motor generator MG2 also has a torque assisting function. It is here assumed that the torque Tr to be output from the ring gear 148 is increased by dTr. This also increases the reactive torque applied on the coordinate axis R. The output torque Te of the engine 200 is thus to be increased to balance the reactive torque. When the engine 200 has no margin for a further increase in output torque Te, for example, when the engine 200 is currently driven to generate the maximum possible torque, the torque output from the motor generator MG2 is to be increased for the torque balance on the coordinate axis R. FIG. 2(b) conceptually shows a torque balance on the coordinate axis R by increasing the output torque of the motor generator MG2, while the output torque Te of the engine 200 is kept unchanged. In the illustrated example, the output torque of the motor generator MG2 is increased by Tas corresponding to the increase in reactive torque by dTr to attain the torque balance. The increase in output torque of the motor generator MG2 is not coverable by the power generation of the motor generator MG1. The supplementary electric power is thus supplied from the electric power accumulated in the battery 150. In the specification hereof, the 'torque assisting function' of the motor generator MG2 represents the function of outputting a supplementary torque with the electric power accumulated in the battery 150 and thereby transmitting the power greater than the output of the engine 200 to the drive shaft. The engine 200 has limitation of torque output. This assisting function of the motor generator MG2 enables a greater power to be output to the drive shaft.

A-3. Structure of Engine with Variable Compression Ratio

Figure 3:
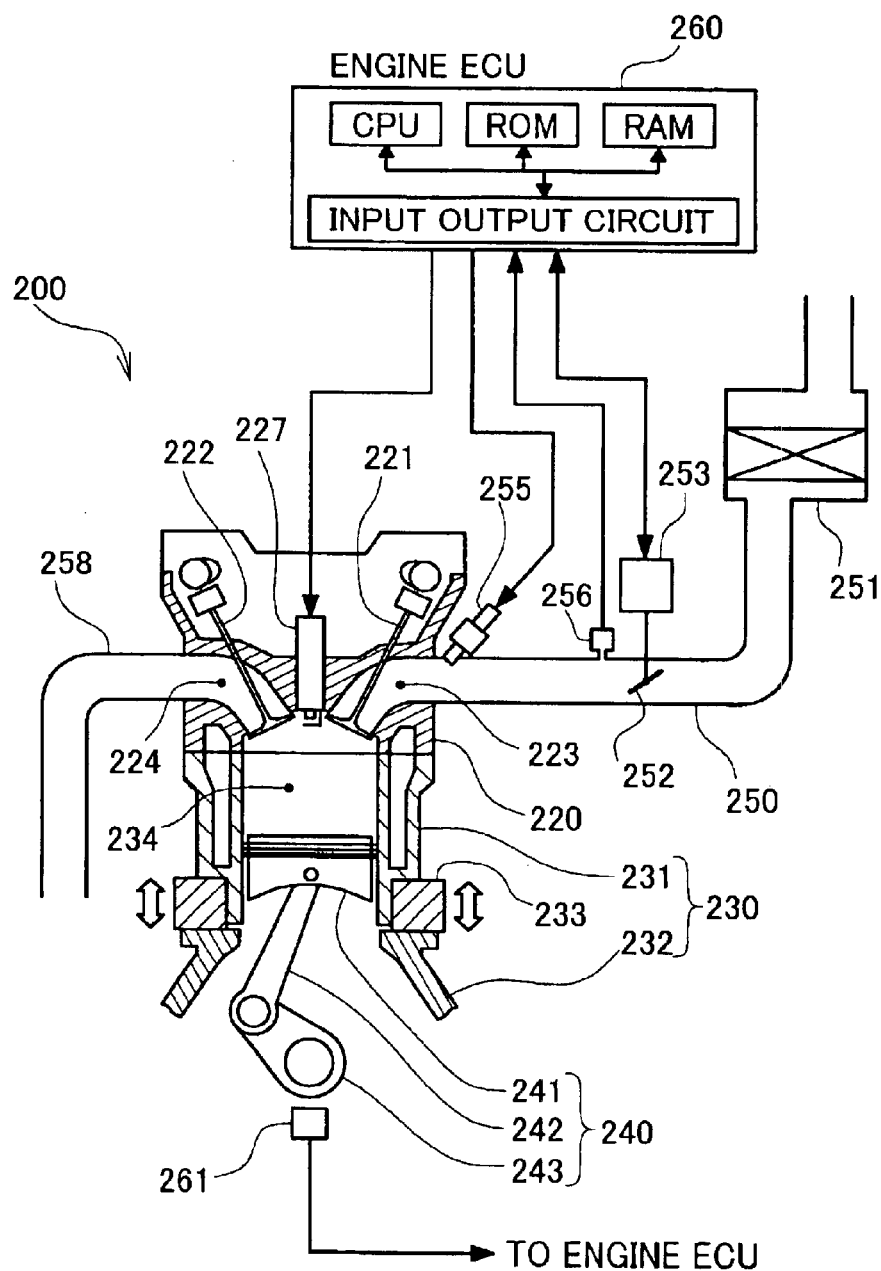
FIG. 3 illustrates the structure of the internal combustion engine with a variable compression ratio mechanism.

The variable compression ratio engine 200, which is capable of varying the compression ratio, is constructed as discussed below. FIG. 3 conceptually illustrates the structure of the engine 200 in the embodiment. As illustrated, the engine 200 mainly includes a cylinder head 220, a cylinder block assembly 230, a main moving assembly 240, an intake conduit 250, an exhaust conduit 258, and the engine ECU 260.

The cylinder block assembly 230 has an upper block 231 with the cylinder head 220 mounted thereon and a lower block 232 to receive the main moving assembly 240 therein. An actuator 233 is interposed between the upper block 231 and the lower block 232. The actuator 233 is driven to vertically move the upper block 231 relative to the lower block 232. A tubular cylinder 234 is formed in the upper block 231.

The main moving assembly 240 has a piston 241 disposed inside the cylinder 234, a crankshaft 243 rotating inside the lower block 232, and a connecting rod 242 connecting the piston 241 with the crankshaft 243. The piston 241, the connecting rod 242, and the crankshaft 243 constitute a crank mechanism. Rotation of the crankshaft 243 slides up and down the piston 241 in the cylinder 234, while the vertical sliding motion of the piston 241 rotates the crankshaft 243 in the lower block 232. Attachment of the cylinder head 220 to the cylinder block assembly 230 gives a space defined by a lower face of the cylinder head 220 (a face coming into contact with the upper block 231), the cylinder 234, and the piston 241. This space functions as a combustion chamber. The upward movement of the upper block 231 by actuation of the actuator 233 moves the cylinder head 220 up to increase the inner volume of the combustion chamber, thus lowering the compression ratio. The downward movement of the cylinder head 220 with the upper block 231, on the other hand, reduces the inner volume of the combustion chamber to heighten the compression ratio.

The cylinder head 220 has an intake port 223 to take the air into the combustion chamber and an exhaust port 224 to discharge the gaseous exhaust from the combustion chamber. An intake valve 221 is set at an opening of the intake port 223 to the combustion chamber, and an exhaust valve 222 is set at an opening of the exhaust port 224 to the combustion chamber. The intake valve 221 and the exhaust valve 222 are driven by respective cam mechanisms with the vertical motions of the piston 241. The on-off control of the intake valve 221 and the exhaust valve 222 at respective adequate timings in synchronism with the motions of the piston 241 takes the air into the combustion chamber and discharges the exhaust gas from the combustion chamber. The cylinder head 220 has an ignition plug 227, which ignites the air-fuel mixture with a spark in the combustion chamber.

The intake port 223 of the cylinder head 220 is connected with the intake conduit 250 to lead the flow of the air to the cylinder head 220. An air cleaner 251 is provided on an upstream end of the intake conduit 250. The supply of the air goes through the air cleaner 251 for removal of dust and foreign substances, and is flown through the intake conduit 250 and the intake port 223 into the combustion chamber. A throttle valve 252 and a fuel injection valve 255 are arranged in the intake conduit 250. The opening of the throttle valve 252 is regulated by an electric actuator 253 to control the quantity of the air flown into the combustion chamber. The supply of the fuel is injected from the fuel injection valve 255 toward the intake port 223. The injected fuel spray is partly vaporized in the intake port 223. The residual portion of the fuel spray is flown into the combustion chamber in the atomized state or in the liquid film state and is vaporized and mixed with the air to form the air-fuel mixture in the combustion chamber. An intake pressure sensor 256 is located in the intake conduit 250 to measure the inner pressure of the intake conduit 250.

The exhaust port 224 of the cylinder 220 is connected with the exhaust conduit 258. The flow of gaseous exhaust discharged from the combustion chamber goes through the exhaust conduit 258 and is released to the outside air.

Figure 4:
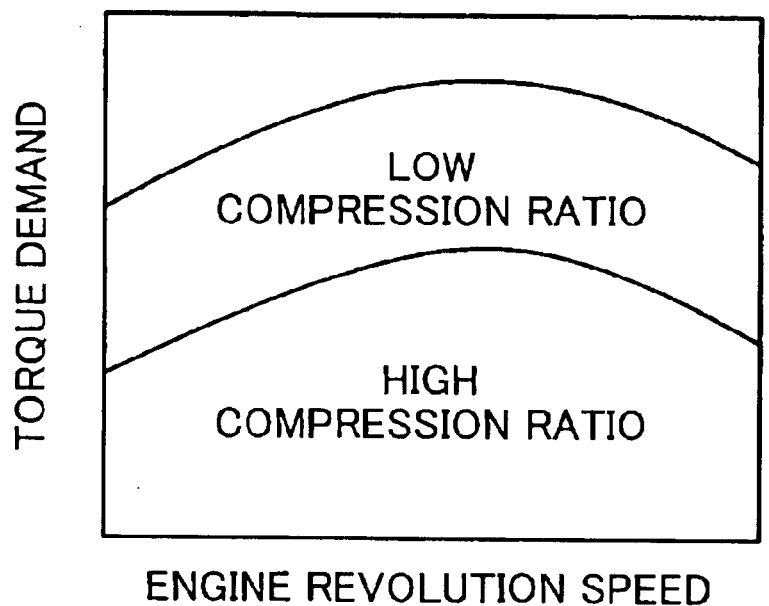
FIG. 4 conceptually shows a map of settings of the compression ratio in the engine relative to the revolution speed and the torque demand of the engine.

The engine ECU 260 takes charge of control to change over the compression ratio. A map of settings of the compression ratio relative to the torque demand to the engine and the engine revolution speed as parameters is stored in a ROM built in the engine ECU 260. FIG. 4 conceptually shows an example of such a compression ratio map. In the map of FIG. 4, the compression ratio is changed over in two stages, that is, between a high compression ratio and a low compression ratio. The compression ratio may be changed over in a greater number of stages, according to the requirements. The engine ECU 260 receives an output of a crank angle sensor 261 attached to the crankshaft 243 and specifies the engine revolution speed. The engine ECU 260 receives a torque demand, which is to be output from the engine 200, from the hybrid ECU 160. The engine ECU 260 reads the adequate setting of the compression ratio corresponding to the input torque demand and the specified engine revolution speed from the map of FIG. 4 and drives the actuator 233 to set the selected compression ratio in the engine 200. In the case of a large torque demand to be output from the engine 200, selection of the low compression ratio ensures generation of a sufficient torque without raising the potential for the occurrence of knocking. In the case of a small torque demand to be output from the engine 200, on the other hand, selection of the high compression ratio desirably enhances the thermal efficiency of the engine 200.

While controlling the changeover of the compression ratio, the engine ECU 260 receives required pieces of information from, for example, the crank angle sensor 261 attached to the crankshaft 243 and the intake pressure sensor 256, and drives the ignition plug 227, the fuel injection valve 255, and the electric actuator 253 to control the operations of the whole engine 200.

As described above, the engine 200 is capable of changing over the compression ratio according to the driving conditions, so as to enhance the thermal efficiency and the maximum output of the engine 200 simultaneously. The changeover of the compression ratio, however, needs a certain amount of energy. The frequent changeover of the compression ratio consumes a significant mass of energy and undesirably lowers the total efficiency of the engine 200. The changeover of the compression ratio also needs a certain time period. The frequent changeover of the compression ratio may thus give the driver of the hybrid vehicle 100 some sense of discomfort. The different settings of the compression ratio lead to different engine driving conditions and different engine outputs. The frequent changeover of the compression ratio thus causes a variation in engine output, which may give the driver some sense of discomfort. A complicated control strategy is required to avoid such sense of discomfort. The hybrid vehicle 100 of the embodiment takes advantage of the torque assisting function of the motor generator MG2 to effectively resolve this issue of the engine 200, as discussed below.

B. Drive Control of First Embodiment

Figure 5:
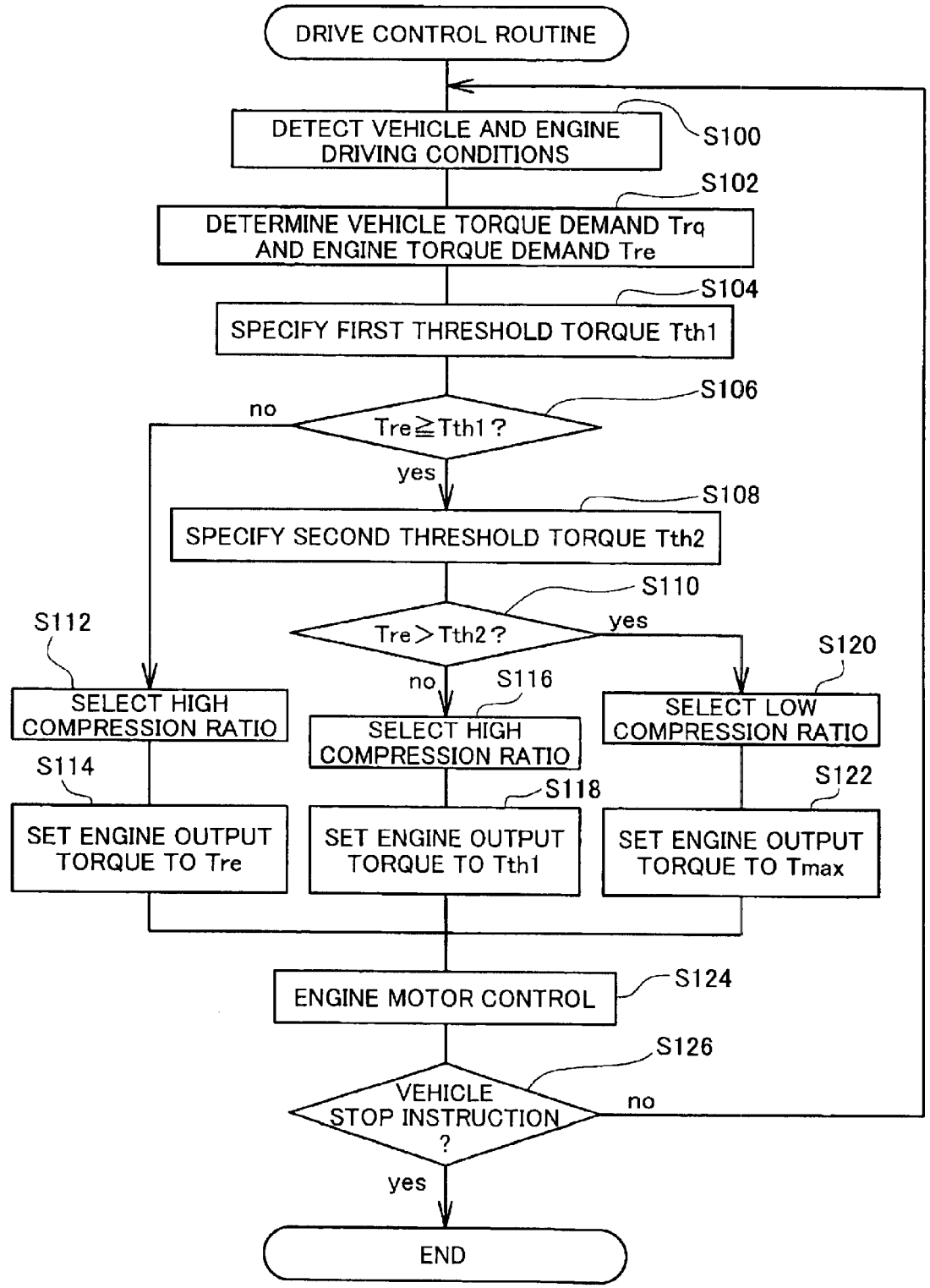
FIG. 5 is a flowchart showing a drive control routine executed in a first embodiment.

FIG. 5 is a flowchart showing a drive control routine executed in a first embodiment to control the operations of the engine 200 and the motor generators MG1 and MG2 and thereby control the driving conditions of the hybrid vehicle 100. This drive control routine is mainly executed by the hybrid ECU 160 and effectively utilizes the torque assisting function of the motor generator MG2 to adequately change over the compression ratio set in the engine 200.

When the drive control routine of the first embodiment starts, the hybrid ECU 160 first detects the driving conditions of the hybrid vehicle 100 and the engine 200 (step S100). The driving conditions of the hybrid vehicle 100 are a step-on amount of an accelerator pedal and the revolution speed Nr of the ring gear 148. The step-on amount of the accelerator pedal is observed by the accelerator position sensor 162 attached to the accelerator pedal. The revolution speed Nr of the ring gear 148 is calculated from the output of the resolver 136 attached to the motor generator MG2. The driving condition of the engine 200 is the engine revolution speed Ne. As mentioned previously, the engine revolution speed Ne is calculated from the output of the crank angle sensor 261.

The hybrid ECU 160 determines a vehicle torque demand Trq and an engine torque demand Tre, based on the step-on amount of the accelerator pedal and the revolution speed Nr of the ring gear 148 (step S102). Here the vehicle torque demand Trq represents a torque to be output from the ring gear 148, in response to the driver's request. The engine torque demand Tre represents a torque to be output from the engine 200, in order to meet the vehicle torque demand Trq of the ring gear 148. The vehicle torque demand Trq and the engine torque demand Tre are determined as discussed below.

The driver of the vehicle steps on the accelerator pedal, when feeling an insufficiency of torque output. The step-on amount of the accelerator pedal (that is, the output of the accelerator position sensor 162) accordingly reflects the driver's torque demand (that is, the vehicle torque demand Trq). The operational amount of the accelerator pedal also depends upon the driving speed of the vehicle (that is, the revolution speed Nr of the ring gear 148). The driver's torque demand is experimentally specified relative to the step-on amount of the accelerator pedal and the revolution speed Nr of the ring gear 148 as parameters and is stored in the form of a map in the ROM of the hybrid ECU 160. The concrete procedure of step S102 refers to this map and determines the vehicle torque demand Trq.

After determination of the vehicle torque demand Trq, the engine torque demand Tre is determined by the following procedure. The revolution speed of the ring gear 148 does not abruptly change from the current revolution speed Nr. The vehicle torque demand Trq indicates requirement of output of the power TrqxNr from the ring gear 148. Namely output of the energy TrqxNr per unit time is required. As described above with reference to FIGS. 2(a) and 2(b), the planetary gear 140 and the motor generators MG1 and MG2 function to convert the output of the engine 200 and make the converted torque output from the ring gear 148. Output of the power TrqxNp from the engine 200 is thus sufficient. The revolution speed of the engine 200 does not abruptly change from the current revolution speed Ne. In order to meet the requirement of output of the vehicle torque demand Trq from the ring gear 148, the engine 200 needs to output a torque TrqxNr/Ne. The engine torque demand Tre is thus calculated as:

$$Tre = (Trqx\ Nr)/Ne$$

The control routine determines the vehicle torque demand Trq and the engine torque demand Tre in this manner at step S102 in the flowchart of FIG. 5.

The hybrid ECU 160 subsequently specifies a first threshold torque Tth1 (step S104). The first threshold torque Tth1 represents a reference torque as the criterion of changeover of the compression ratio set in the engine 200 between the high compression ratio and the low compression ratio, as shown in FIG. 4. The setting of the high compression ratio is selected, when the output torque of the engine is smaller than the first threshold torque Tth1. The setting of the low compression ratio is selected, on the other hand, when the output torque of the engine is greater than the first threshold torque Tth1. A map of the first threshold torque Tth1 to the engine revolution speed Ne is stored in advance in the ROM of the hybrid ECU 160. The concrete procedure of step S104 refers to this map and specifies the first threshold torque Tth1 corresponding to the engine revolution speed Ne detected at step S100.

After determination of the engine torque demand Tre and specification of the first threshold torque Tth1, the engine torque demand Tre is compared with the first threshold torque Tth1 (step S106). When the engine torque demand Tre is smaller than the first threshold torque Tth1 (step S106: No), the high compression ratio is selected as the compression ratio set in the engine 200 (step S112). The setting of the compression ratio is effectuated by driving the actuator 233 shown in FIG. 3. The actuator 233 is driven to move down the upper block 231 and the cylinder head 220 toward the lower block 232, thereby setting the high compression ratio in the engine 200.

The hybrid ECU 160 subsequently sets the output torque of the engine 200 to the engine torque demand Tre (step S114) and carries out engine motor control (step S124). The engine motor control controls the engine 200 to output the engine torque demand Tre, while controlling the motor generators MG1 and MG2 to perform the torque conversion discussed above. This causes the vehicle torque demand Trq to be output from the ring gear 148. The engine ECU 260 takes charge of control of the engine 200 and regulates the opening of the throttle valve 252, the amount of fuel injection, and the ignition timing to ensure output of a preset torque (the engine torque demand Tre) from the engine 200. The motor ECU 156 regulates the revolution speeds and the output torques of the motor generators MG1 and MG2. The revolution speed and the output torque of each motor are adjustable by regulating the frequency of the applied alternating current and by regulating the intensity of the applied current, respectively. Under control of the hybrid ECU 160, the motor ECU 156 thus controls the motor generators MG1 and MG2 to ensure output of adequate torques and adequate revolution speeds. The engine ECU 260 and the motor ECU 156 adequately control the engine 200 and the motor generators MG1 and MG2 under control of the hybrid ECU 160, so that the vehicle torque demand Trq desired by the driver of the vehicle is output from the ring gear 148.

When the engine torque demand Tre is not smaller than the first threshold torque Tth1 (step S106: Yes), the hybrid ECU 160 specifies a second threshold torque Tth2 (step S108). The second threshold torque Tth2 is obtained by adding a preset value to the first threshold torque Tth1 in this embodiment, although another suitable method may be applied to specify the second threshold torque Tth2. For example, like the first threshold torque Tth1, the procedure may specify the second threshold torque Tth2 by referring to a preset map of the second threshold torque Tth2 to the engine revolution speed Ne.

The engine torque demand Tre is then compared with the second threshold torque Tth2 (step S310). When the engine torque demand Tre is not greater than the second threshold torque Tth2 (step S110: No), the hybrid ECU 160 selects the high compression ratio as the compression ratio set in the engine 200 (step S116), sets the output torque of the engine 200 to the first threshold torque Tth1 (step S118), and carries out the engine motor control (step S124). In this case, while the driver requests output of the vehicle torque demand Trq from the ring gear 148, the output torque of the engine 200 is set equal to the first threshold torque Tth1. The engine motor control thus controls the motor generator MG2 to supplement any deficiency of torque by its torque assisting function.

When the engine torque demand Tre is greater than the second threshold torque Tth2 (step S110: Yes), the hybrid ECU 160 selects the low compression ratio as the compression ratio set in the engine 200 (step S120), set the output torque of the engine 200 to a maximum torque Tmax of the engine 200 (step S122), and carries out the engine motor control (step S124). The engine motor control in this state controls the engine 200 to output the maximum torque Tmax, while controlling the motor generator MG2 to supplement any deficiency of torque by its torque assisting function.

After the engine motor control of controlling the engine 200 and the motor generators MG1 and MG2 to fulfill the vehicle torque demand Trq desired by the driver of the vehicle, it is determined whether the driver has given a vehicle stop instruction (step S126). When no vehicle stop instruction has yet been given, the program returns to step S100 and repeats the series of processing discussed above until the driver's vehicle stop instruction is received.

As described above, the drive control of the first embodiment changes over the setting of the compression ratio in the engine 200 and activates or inactivates the torque assisting function of the motor generator MG2 according to the relation between the engine torque demand Tre and the first threshold torque Tth1 and the relation between the engine torque demand Tre and the second threshold torque Tth2.

The adequate changeover of the compression ratio set in the engine 200 significantly improves the operational performance of the vehicle, while keeping the high thermal efficiency. This is discussed in detail with reference to FIG. 6.

Figure 6:
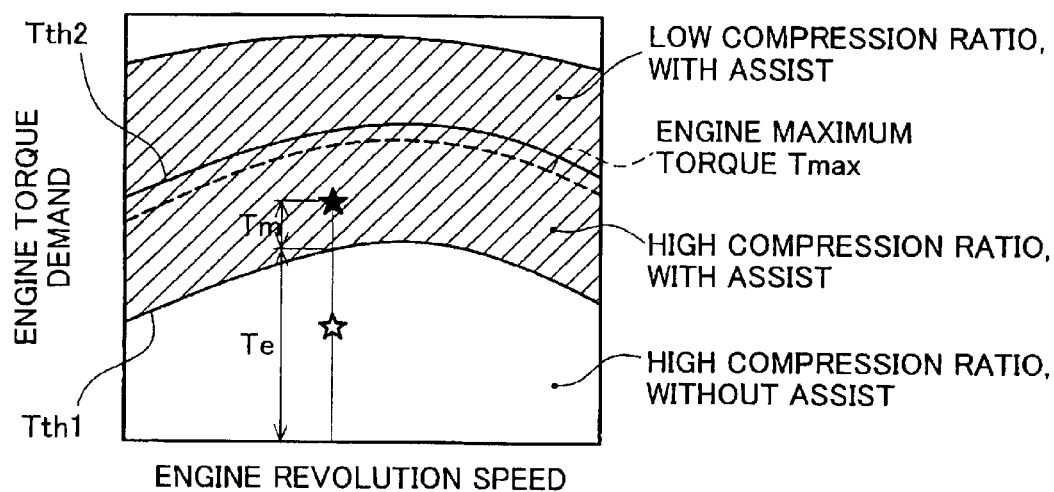
FIG. 6 shows a process of changeover of the compression ratio in combination with activation or inactivation of a torque assisting function according to the drive control of the first embodiment.

FIG. 6 conceptually shows changeover of the setting of the compression ratio in the engine 200 and selection of activation or inactivation of the torque assisting function of the motor generator MG2, in response to a variation in engine torque demand Tre. As illustrated, the first threshold torque Tth1 and the second threshold torque Tth2 are respectively specified against specified as the engine revolution speed. The maximum torque Tmax of the engine 200 is shown by a curve of broken line in FIG. 6. A hatched area represents the activation area of the torque assisting function of the motor generator MG2. The hatched area is extended to the higher torque than the maximum torque Tmax defined by the curve of broken line. This means that the torque assisting function of the motor generator MG2 enables output of a torque greater than the maximum torque Tmax of the engine 200.

In an area of the engine torque demand Tre smaller than the first threshold torque Tth1, the engine 200 is driven at the high compression ratio without the torque assisting function of the motor generator MG2. For example, the engine torque demand Tre equal to a torque expressed by an open star in FIG. 6 is in this area. There is no fear of the occurrence of knocking in the area of such low engine load, the setting of the high compression ratio is selected. This enables the engine 200 to be driven at the high thermal efficiency.

In an area of the engine torque demand Tre greater than the first threshold torque Tth1 but smaller than the second threshold torque Tth2, the engine 200 and the motor generator MG2 share the output of the torque demand. For example, when the engine torque demand Tre is equal to a torque expressed by a closed star in FIG. 6, the engine 200 outputs the torque Te corresponding to the first threshold torque Tth1, while the motor generator MG2 outputs a deficient torque Tm. Even when the engine torque demand Tre exceeds the first threshold torque Tth1, the output torque of the engine 200 is kept to the first threshold torque Tth1. This arrangement allows selection of the high compression ratio as the setting of the compression ratio in the engine 200 and thereby enhances the thermal efficiency.

This arrangement also significantly improves the operational performance of the vehicle. For example, it is assumed that the engine torque demand Tre increases from the torque expressed by the open star to the torque expressed by the closed star in FIG. 6. In this case, the engine torque demand Tre exceeds the torque limit Tth1 output from the engine 200 at the high compression ratio. The output torque of the engine 200 is kept to the torque limit Tth1, and the motor generator MG2 assists to supplement any deficiency of torque. This arrangement does not require changeover of the compression ratio set in the engine 200 and keeps the driver of the vehicle free from the sense of discomfort caused by the changeover. The motor generator MG2 is capable of a quick increase of the output torque. The motor generator MG2 thus instantly increases the torque, in response to the driver's demand. This significantly improves the operational performance of the vehicle.

The motor generator MG2 naturally has a limit of assisting torque. In the illustrated example of FIG. 6, a motor that is capable of outputting a relatively large assisting torque is applied for the motor generator MG2. While the engine 200 is kept at the high compression ratio, the motor generator MG2 outputs the assisting torque to fulfill the engine torque demand Tre, which is greater than the maximum torque Tmax of the engine 200. The second threshold torque Tth2 accordingly represents a torque including a supplementary torque by the torque assisting function of the motor generator MG2, while the engine 200 is kept at the high compression ratio.

In the above description, the second threshold torque Tth2 is specified as the sum of the maximum output torque of the engine 200 at the high compression ratio and the maximum assist torque of the motor generator MG2. The second threshold torque Tth2 may be set with some margins to the maximum output torque of the engine 200 and the maximum assist torque of the motor generator MG2. This setting is advantageous when quick output of a torque greater than the second threshold torque Tth2 is required. A torque increase of the engine 200 or the motor generator MG2 may fulfill the requirement, as long as the requirement is moderate.

In an area of the engine torque demand Tre greater than the second threshold torque Tth2, the engine 200 is driven to output the maximum torque Tmax after the changeover to the low compression ratio. The motor generator MG2 outputs the assisting torque to supplement any deficiency of torque. As mentioned above, the second threshold torque Tth2 is set to be greater than the maximum torque Tmax of the engine 200. The changeover to the low compression ratio to increase the output of the engine 200 is thus not sufficient, and the torque assisting function of the motor generator MG2 is required. Setting of the low compression ratio in the engine 200 in combination with the torque assisting function of the motor generator MG2 ensures output of a sufficiently large torque.

The setting of the second threshold torque Tth2 with some margin to the maximum assisting torque of the motor generator MG2 has another advantage. When the output torque of the engine 200 is lowered in the course of changeover of the compression ratio, the output torque of the motor generator MG2 is increased to supplement the lowered output torque. This arrangement desirably keeps the driver of the vehicle free from the sense of discomfort.

As described above, the hybrid vehicle 100 of the embodiment is driven with changeover of the setting of the compression ratio in the engine 200 and the selection of activation or inactivation of the torque assisting function of the motor generator MG2, in response to the torque demand, as shown in FIG. 6. This technique enables the engine 200 to be driven at the high compression ratio in a wide driving area, thus maintaining the high thermal efficiency of the engine 200. The changeover of the compression ratio is required only when the engine torque demand Tre becomes greater than the second threshold torque Tth2. This arrangement does not require frequent changeover of the compression ratio, which may undesirably consume large energy and lower the total thermal efficiency of the engine 200. In response to the engine torque demand Tre greater than the first threshold torque Tth1, the technique of the embodiment does not change over the setting of the compression ratio in the engine 200 but activates the torque assisting function of the motor generator MG2. This ensures a quick increase of the output torque and significantly improves the operational performance of the vehicle. This method does not need the control for changeover of the setting of the compression ratio in the engine 200 in this state and thereby desirably simplifies the control strategy of the vehicle. In response to a greater torque demand, the technique of the embodiment changes over the setting of the compression ratio in the engine 200 to the low compression ratio and activates the torque assisting function of the motor generator MG2. This outputs a large torque to fulfill the greater torque demand and enables the driver to smoothly drive the vehicle.

Figure 7:
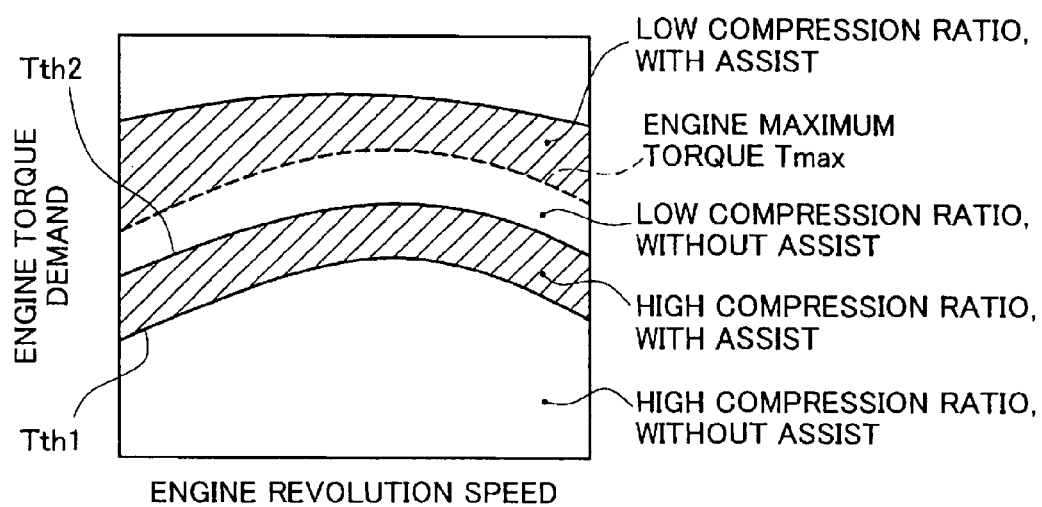
FIG. 7 shows another process of changeover of the compression ratio in combination with activation or inactivation of a torque assisting function according to the drive control of the first embodiment.

In the structure of the embodiment discussed above, the motor generator MG2 is capable of outputting a relatively large assisting torque. The second threshold torque Tth2 is accordingly set greater than the maximum torque Tmax of the engine 200. The motor generator MG2 is, however, not restricted to the motor of outputting such a large torque. As in an illustrated example of FIG. 7, the setting of the second threshold torque Tth2 may be smaller than the maximum torque Tmax of the engine 200. In this case, the control scheme changes over the combination of the setting of the compression ratio in the engine 200 with activation or inactivation of the torque assisting function of the motor generator MG2, in response to a variation in engine torque demand Tre, as discussed below. In the area of the engine torque demand Tre smaller than the first threshold torque Tth1, the control scheme selects the combination of 'the high compression ratio+inactivation of the torque assisting function'. When the engine torque demand Tre rises to be greater than the first threshold torque Tth1, the control scheme activates the torque assisting function of the motor generator MG2, while keeping the setting of the high compression ratio in the engine 200. When the engine torque demand Tre further rises to be greater than the second threshold torque Tth2, the control scheme changes over the setting of the compression ratio in the engine 200 to the low compression ratio to increase the output torque. The low compression ratio gives a sufficient margin to the occurrence of knocking. Adjustment of the ignition timing thus effectively increases the output torque. With the increase in output torque of the engine 200, the torque assisting function of the motor generator MG2 is inactivated. In response to a further increase in engine torque demand Tre to be greater than the maximum torque Tmax, the torque assisting function of the motor generator MG2 is activated again to supplement any deficiency of torque.

This modified scheme changes over the setting of the compression ratio in the engine 200 and selects activation or inactivation of the torque assisting function of the motor generator MG2 in this manner, in response to a variation in engine torque demand Tre. The motor generator MG2 is thus not required to output a large assisting torque, and a motor of a relatively small capacity is applicable to the motor generator MG2. As clearly understood from the comparison between FIGS. 6 and 7, the control scheme has the shortened activation time of the torque assisting function of the motor generator MG2 under the conditions of FIG. 7. The battery 150 (see FIG. 1) may accordingly have a smaller capacity.

Under the conditions of FIG. 6, on the other hand, the control scheme has the lowered frequency of changeover between activation and inactivation of the torque assisting function of the motor generator MG2. This advantageously simplifies the control procedure and keeps the vehicle of the driver free from the sense of discomfort, due to the frequent changeover between activation and inactivation of the torque assisting function.

C. Drive Control of Second Embodiment

The drive control of the first embodiment changes over the setting of the compression ratio in the engine 200, in combination with activation or inactivation of the torque assisting function of the motor generator MG2, in response to a variation in engine torque demand Tre. The state of charge of the battery 150 may also be taken into account, in addition to the engine torque demand Tre. This is described below as a drive control of a second embodiment.

Figure 8:
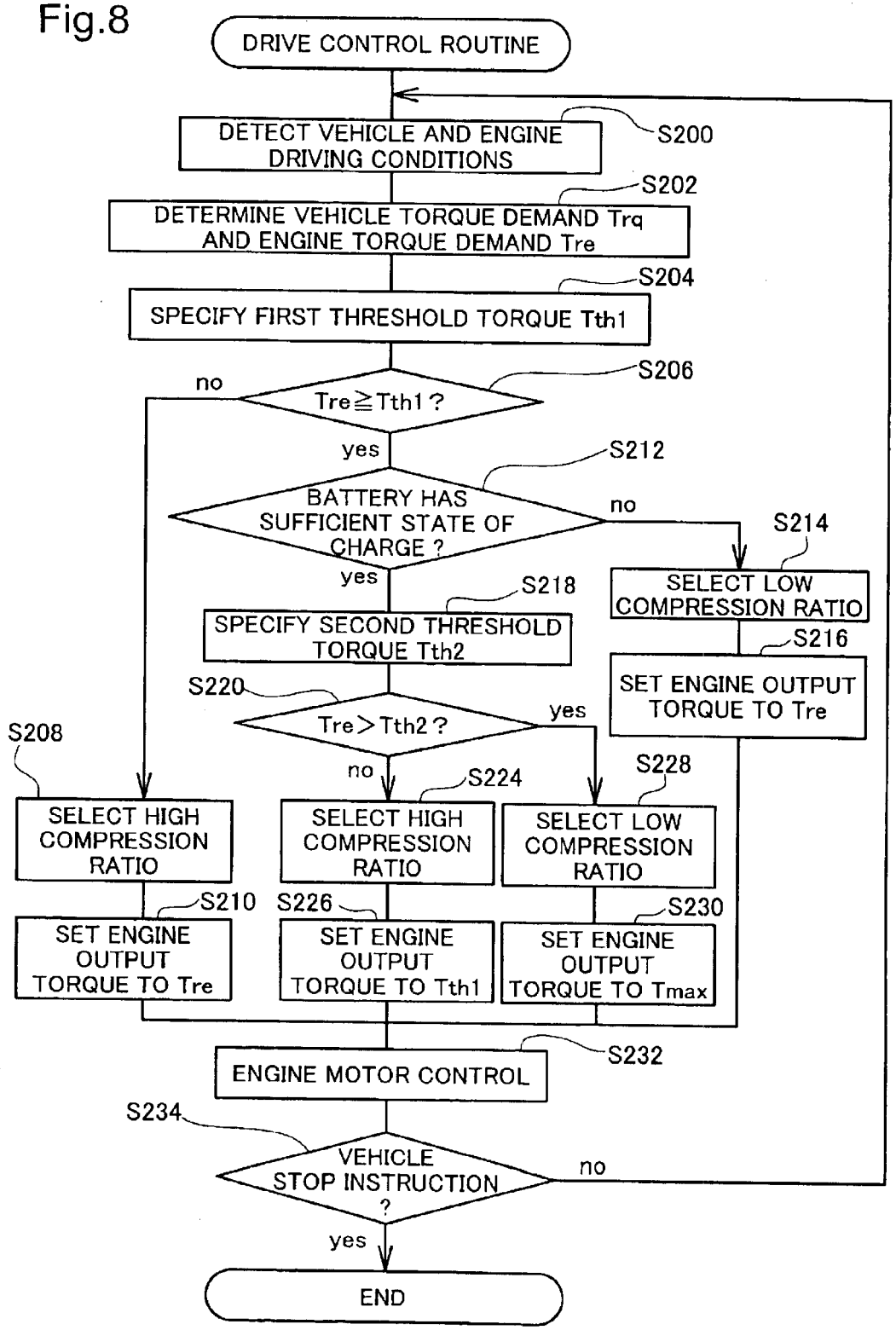
FIG. 8 is a flowchart showing a drive control routine executed in a second embodiment.

FIG. 8 is a flowchart showing a drive control routine executed in the second embodiment. The major difference from the drive control routine of the first embodiment shown in the flowchart of FIG. 5 is decision on the state of charge of the battery 150. Otherwise the drive control of the second embodiment is rather similar to that of the first embodiment. The drive control routine of the second embodiment is briefly described below, with the focus on the difference from the first embodiment.

Like the drive control routine of the first embodiment, when the drive control routine of the second embodiment starts, the hybrid ECU 160 first detects the step-on amount of the accelerator pedal, the revolution speed Nr of the ring gear 148, and the revolution speed Ne of the engine 200 as the driving conditions of the vehicle and the engine 200 (step S200), and determines the vehicle torque demand Trq and the engine torque demand Tre based on the detected driving conditions (step S202). The method of determining the vehicle torque demand Trq and the engine torque demand Tre is identical with that of the first embodiment and is thus not specifically described here.

The hybrid ECU 160 subsequently specifies the first threshold torque Tth1 (step S204) and compares the engine torque demand Tre with the specified first threshold torque Tth1 (step S206). When the engine torque demand Tre is smaller than the first threshold torque Tth1 (step S206: No), the hybrid ECU 160 selects the high compression ratio as the setting of the compression ratio in the engine 200 (step S208), sets the output torque of the engine 200 to the engine torque demand Tre (step S210), and carries out the engine motor control (step S232). This is identical with the processing of the first embodiment.

When the engine torque demand Tre is not smaller than the first threshold torque Tth1 (step S206: Yes), the drive control routine of the second embodiment subsequently determines whether the battery 150 has a sufficient state of charge (step S212). The hybrid ECU 160 continuously monitors the charge and discharge of the battery 150 and detects the current state of charge of the battery 150. When the battery 150 does not have the sufficient state of charge (step S212: No), the hybrid ECU 160 selects the low compression ratio as the setting of the compression ratio in the engine 200 (step S214), sets the output torque of the engine 200 to the engine torque demand Tre (step S216), and carries out the engine motor control (step S232). In the case of the insufficient state of charge of the battery 150, the drive control does not activate the torque assisting function of the motor generator MG2 but lowers the setting of the compression ratio in the engine 20 to ensure output of the whole torque demand from the engine 200. The sufficiency in state of charge of the battery 150 is determined by comparing the current state of charge with a predetermined threshold value.

When the battery 150 has the sufficient state of charge (step S212: Yes), on the other hand, the hybrid ECU 160 specifies the second threshold torque Tth2 (step S218). Like the first embodiment, the drive control routine of the second embodiment calculates the second threshold torque Tth2 by adding a preset value to the first threshold torque Tth1, although another method is applicable to specify the second threshold torque Tth2.

The engine torque demand Tre is then compared with the second threshold torque Tth2 (step S220). When the engine torque demand Tre is not greater than the second threshold torque Tth2 (step S220: No), the hybrid ECU 160 selects the high compression ratio as the setting of the compression ratio in the engine 200 (step S224), sets the output torque of the engine 200 to the first threshold torque Tth1 (step S226), and carries out the engine motor control (step S232). While the driver requests output of the engine torque demand Tre from the engine 200, the output torque of the engine 200 is set equal to the first threshold torque Tth1. The engine motor control in this state controls the engine 200 to output the torque Tth1 at the high compression ratio, while controlling the motor generator MG2 to supplement any deficiency of torque by its torque assisting function.

When the engine torque demand Tre is greater than the second threshold torque Tth2 (step S220: Yes), the hybrid ECU 160 selects the low compression ratio as the setting of the compression ratio in the engine 200 (step S228), sets the output torque of the engne 200 to the maximum torque Tmax of the engine 200 (step S230), and carries out the engine motor control (step S232). The engine motor control in this state controls the engine 200 to output the maximum torque Tmax, while controlling the motor generator MG2 to supplement any deficiency of torque by its torque assisting function.

After the engine motor control of controlling the engine 200 and the motor generators MG1 and MG2 to fulfill the vehicle torque demand Trq desired by the driver of the vehicle, it is determined whether the driver has given a vehicle stop instruction (step S234). When no vehicle stop instruction has yet been given, the program returns to step S200 and repeats the series of processing discussed above until the driver's vehicle stop instruction is received.

As described above, even when the engine torque demand Tre exceeds the first threshold torque Tth1, in the insufficient state of charge of the battery 150, the drive control of the second embodiment changes over the setting of the compression ratio in the engine 200 to the low compression ratio. This changeover enables the engine 200 to output the whole engine torque demand Tre without activating the torque assisting function of the motor generator MG2. Namely the drive control of the second embodiment selectively activates or inactivates the torque assisting function of the motor generator MG2 according to the state of charge of the battery 150. This attains efficient use of the battery 150.

D. Drive Control of Third Embodiment

The drive controls of the first and the second embodiments discussed above do not take into account the elapse of time to change over the setting of the compression ratio in the engine 200 or to select activation or inactivation of the torque assisting function of the motor generator MG2. Neither the setting of the compression ratio nor the status of the torque assisting function is changed, as long as the driving conditions are kept unchanged. Another applicable procedure takes into account the elapse of time and activates the torque assisting function of the motor generator MG2 to reduce the frequency of changeover of the setting of the compression ratio when an increase in engine torque demand continues only for a short time period. This is described below as a drive control of a third embodiment.

Figure 9:
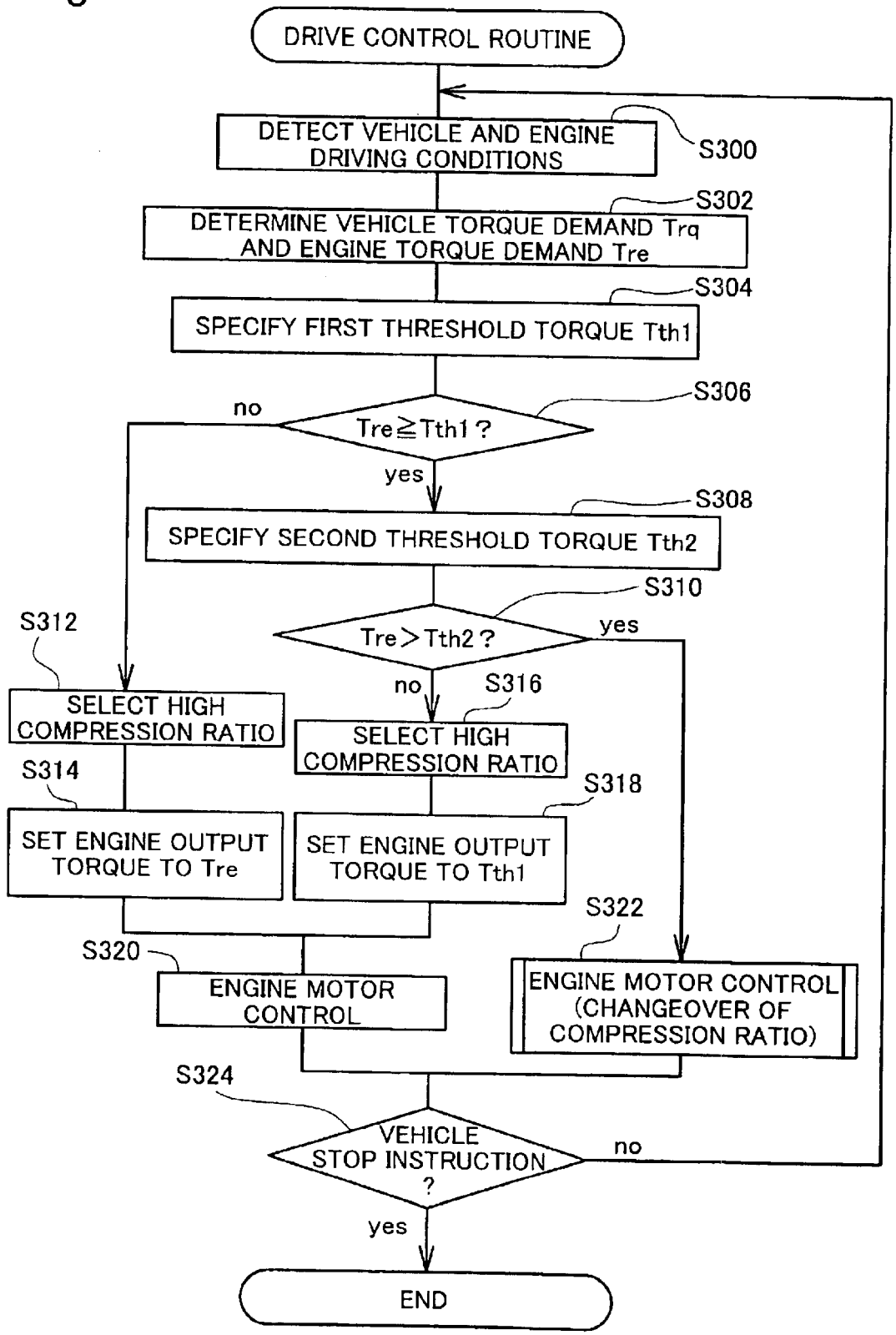
FIG. 9 is a flowchart showing a drive control routine executed in a third embodiment.

FIG. 9 is a flowchart showing a drive control routine executed in the third embodiment. The major difference from the drive control routine of the first embodiment shown in the flowchart of FIG. 5 is a series of processing carried out when the engine torque demand Tre exceeds the second threshold torque Tth2. Otherwise the drive control of the third embodiment is rather similar to that of the first embodiment. The drive control routine of the third embodiment is briefly described below, with the focus on the difference from the first embodiment.

Like the drive control routine of the first embodiment, when the drive control routine of the third embodiment starts, the hybrid ECU 160 first detects the step-on amount of the accelerator pedal, the revolution speed Nr of the ring gear 148, and the revolution speed Ne of the engine 200 as the driving conditions of the vehicle and the engine 200 (step S300), and determines the vehicle torque demand Trq and the engine torque demand Tre based on the detected driving conditions (step S302). The hybrid ECU 160 subsequently specifies the first threshold torque Tth1 (step S304) and compares the engine torque demand Tre with the first threshold torque Tth1 (step S306). When the engine torque demand Tre is smaller than the first threshold torque Tth1 (step S306: No), the hybrid ECU 160 selects the high compression ratio as the setting of the compression ratio in the engine 200 (step S312), sets the output torque of the engine 200 to the engine torque demand Tre (step S314), and carries out the engine motor control (step S320).

When the engine torque demand Tre is not smaller than the first threshold torque Tth1 (step S306: Yes), the hybrid ECU 160 specifies the second threshold torque Tth2 (step S208) and compares the engine torque demand Tre with the second threshold torque Tth2 (step S310). The second threshold torque Tth2 is calculated by adding a preset value to the first threshold torque Tth1. When the engine torque demand Tre is not greater than the second threshold torque Tth2 (step S310: No), the hybrid ECU 160 selects the high compression ratio as the setting of the compression ratio in the engine 200 (step S316), sets the output torque of the engine 200 to the first threshold torque Tth1 (step S318), and carries out the engine motor control (step S320). When the engine torque demand Tre is greater than the second threshold torque Tth2 (step S310: Yes), on the other hand, the hybrid ECU 160 carries out engine motor control with changeover of the compression ratio (step S322). The details of the engine motor control with changeover of the compression ratio will be discussed later.

After the engine motor control of controlling the engine 200 and the motor generators MG1 and MG2 to fulfill the vehicle torque demand Trq desired by the driver of the vehicle, it is determined whether the driver has given a vehicle stop instruction (step S324). When no vehicle stop instruction has yet been given, the program returns to step S300 and repeats the series of processing discussed above until the driver's vehicle stop instruction is received.

Figure 10:
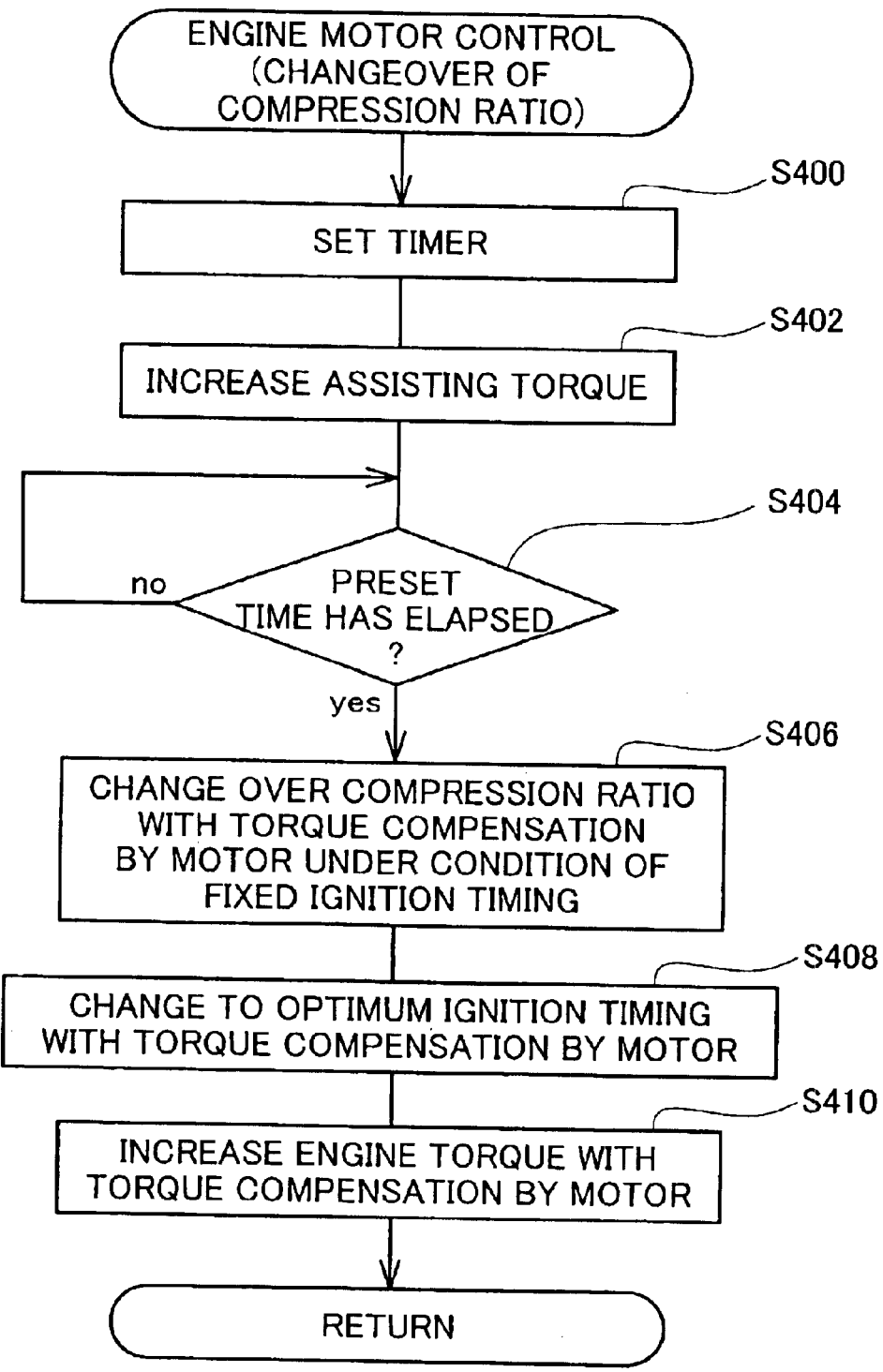
FIG. 10 is a flowchart showing the details of engine motor control with changeover of the compression ratio in the drive control routine of the third embodiment.
Figure 11:
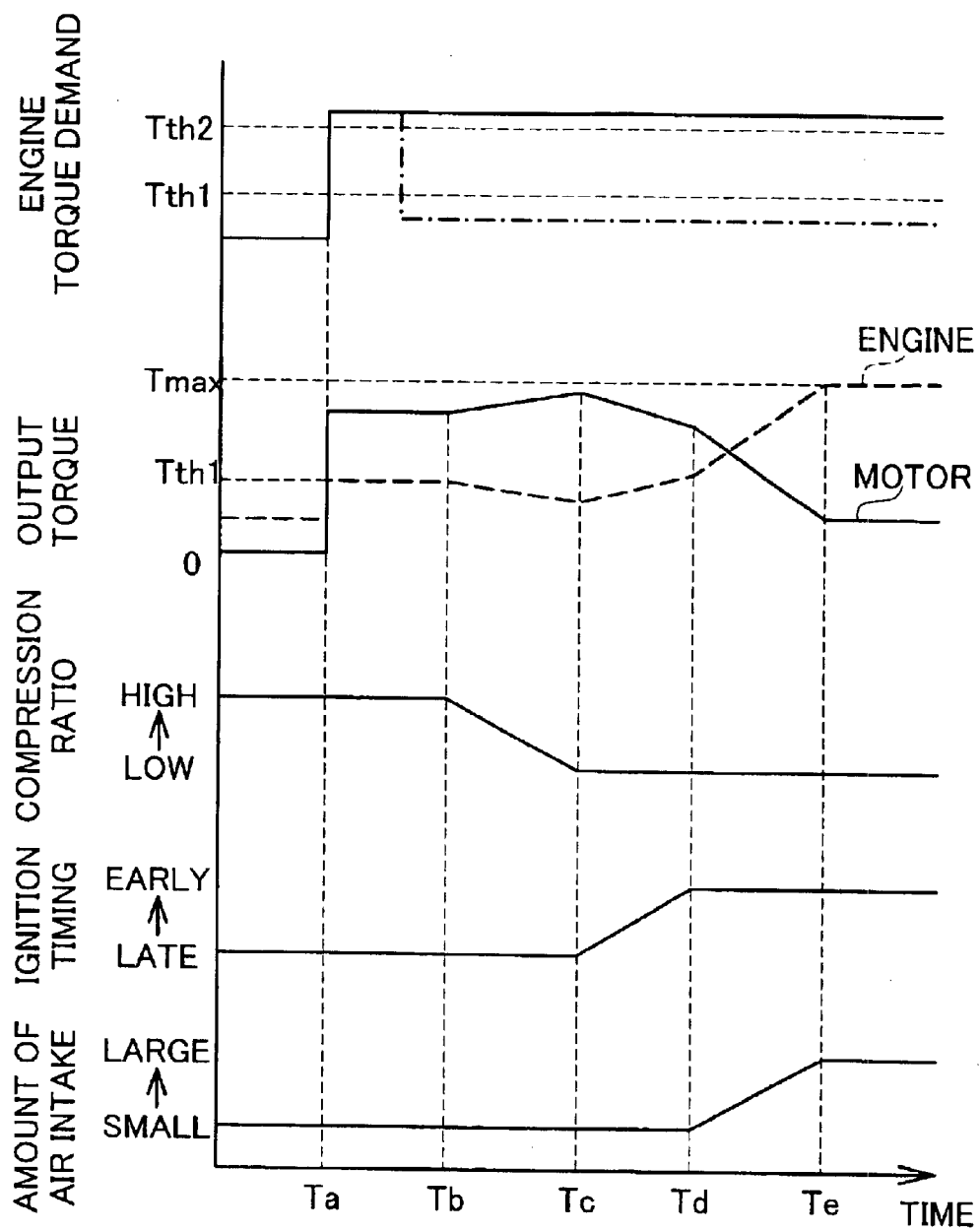
FIG. 11 shows a process of engine motor control with changeover of the compression ratio in the drive control of the third embodiment.

The following describes the engine motor control with the changeover of the compression ratio, which is executed in the drive control routine of the third embodiment. FIG. 10 is a flowchart showing the details of the engine motor control with the changeover of the compression ratio. FIG. 11 conceptually shows changeover of the setting of the compression ratio in the engine 200 from the high compression ratio to the low compression ratio according to the engine motor control of FIG. 10. In this illustrated example, the control changes over the driving state from the combination of the high compression ratio and inactivation of the torque assisting function to the combination of the low compression ratio and activation of the torque assisting function. The description below follows the flowchart of FIG. 10 with reference to FIG. 11.

When the engine motor control of FIG. 10 starts, the hybrid ECU 160 first sets a timer to a preset time dT (step S400) and immediately increases the supplementary torque generated by the torque assisting function of the motor generator MG2 to fulfill the engine torque demand Tre (step S402).

In the illustrated example of FIG. 11, at a time point Ta, the engine torque demand Tre required by the driver increases stepwise from a value of smaller than the first threshold torque Tth1 to a value of greater than the second threshold torque Tth2. As described above with reference to FIG. 6, when the engine torque demand Tre is smaller than the first threshold torque Tth1, the control procedure selects the combination of the high compression ratio and inactivation of the torque assisting function. In the example of FIG. 11, the motor generator MG2 does not trigger its torque assisting function until the time point Ta. The curve of broken line represents the output torque of the engine 200, and the curve of solid line represents the supplementary torque of the motor generator MG2. When the engine torque demand Tre rises to exceed the second threshold torque Tth2 at the time point Ta, the control procedure increases the output torque of the engine 200 to the first threshold torque Tth1, while controlling the motor generator MG2 to supplement a deficiency of torque (=Tre-Tth1)

Until the preset time period dT elapses after the stepwise increase of the engine torque demand Tre, the control procedure keeps this state. Namely the engine 200 is controlled to output the first threshold torque Tth1, while the motor generator MG2 is controlled to supplement the deficiency of torque by its torque assisting function. This corresponds to the processing of step S404 in the flowchart of FIG. 10. The hybrid ECU 160 confirms that the engine torque demand Tre is still greater than the second threshold torque Tth2 after elapse of the preset time dT and changes over the setting of the compression ratio in the engine 200 from the high compression ratio to the low compression ratio (step S406). The compression ratio is changed over under the condition of the fixed ignition timing of the engine 200, while the motor generator MG2 is controlled to compensate for the deficiency of torque. This process is described in detail with reference to FIG. 11.

In the example of FIG. 11, a time point Tb represents elapse of the preset time dT after the timer was set at the time point Ta. The control procedure starts changeover of the setting of the compression ratio in the engine 200 at the time point Tb. As described previously, the changeover of the compression ratio is implemented by moving the cylinder head 220 and the upper block 231 relative to the lower block 232. The changeover accordingly takes some time. In the illustrated example of FIG. 11, the compression ratio is gradually varied in a time period from the time point Tb to a time point Tc.

In this embodiment, during changeover of the compression ratio, the ignition timing is fixed to the optimum timing at the high compression ratio. The different compression ratio naturally gives the different optimum ignition timing. The gradual variation in compression ratio thus gradually changes the optimum ignition timing. The control procedure of the embodiment, however, changes the compression ratio under the condition of the fixed ignition timing. The ignition timing is accordingly deviated from the optimum timing with the variation of the compression ratio. The deviation decreases the output torque of the engine 200. The motor generator MG2 is controlled to increase the supplementary torque and thereby compensate for the decrease in engine torque. In the illustrated example of FIG. 11, during the time period from the time point Tb to the time point Tc, the output torque of the engine 200 shown by the curve of broken line gradually decreases, whereas the supplementary torque of the motor generator MG2 shown by the curve of solid line increases to compensate for the decrease in engine torque.

When the changeover to the low compression ratio is completed, the control procedure gradually adjusts the ignition timing to an optimum timing at the low compression ratio in a time period from the time point Tc to a time point Td. In the course of changeover of the compression ratio, the ignition timing was fixed to the optimum timing at the high compression ratio. On completion of the changeover to the low compression ratio, the ignition timing is changed to the optimum timing at the low compression ratio. Optimization of the ignition timing increases the output torque of the engine 200. The control procedure accordingly reduces the supplementary torque of the motor generator MG2 with the increase in engine torque. In the illustrated example of FIG. 11, during a time period from the time point Tc to a time point Td, the output torque of the engine 200 shown by the curve of broken line increases, whereas the supplementary torque of the motor generator MG2 shown by the curve of solid line decreases to compensate for the increase in engine torque.

At step S408 in the flowchart of FIG. 10, the hybrid ECU 160 changes the ignition timing from the fixed ignition timing under the previous setting of the high compression ratio to the optimum ignition timing under the new setting of the low compression ratio. Optimization of the ignition timing increases the output torque of the engine 200. The motor generator MG2 is controlled to decrease the supplementary torque and thereby compensate for the increase in engine torque.

After adjustment of the ignition timing, the hybrid ECU 160 increases the output torque of the engine 200 to its maximum torque Tmax and accordingly decreases the supplementary torque of the motor generator MG2 at step S410. The output torque of the engine 200 is maximized by setting the throttle valve 252 at the full open position. In the illustrated example of FIG. 11, during a time period from the time point Td to a time point Te, the engine 200 is controlled to increase the output torque to its maximum torque Tmax, whereas the motor generator MG2 is controlled to decrease the supplementary torque and thereby compensate for the increase in engine torque.

The engine motor control carried out in the drive control routine of the third embodiment changes over the setting of the compression ratio in the engine 200 and selects activation or inactivation of the torque assisting function of the motor generator MG2 in this manner. In response to an increase in engine torque demand Tre, the control procedure of the third embodiment does not immediately change the setting of the compression ratio in the engine 200 but controls the motor generator MG2 to activate its torque assisting function and supplement the deficiency of torque. This state is kept for the preset timed T. When the engine torque demand Tre decreases before elapse of the preset time dT as shown by the one-dot chain line in FIG. 11, the control procedure does not change over the setting of the compression ratio in the engine 200. Such control desirably reduces the frequency of changeover of the setting of the compression ratio in the engine 200, in response to a frequent variation in engine torque demand Tre. This arrangement effectively saves energy required for the frequent changeover of the compression ratio and thus enhances the total efficiency of the engine 200.

The above description regards the case of an increase in engine torque demand Tre. The above control procedure is also effectively applied in the case of a decrease in engine torque demand Tre, for example, when the engine torque demand Tre decreases from a value of greater than the second threshold torque Tth2 to a value of smaller than the first threshold torque Tth1. In response to a decrease in engine torque demand Tre, the control procedure does not immediately change the setting of the compression ratio in the engine 200 but controls the motor generator MG2 to compensate for the torque variation. When the engine torque demand Tre is still small after elapse of a preset time, the control procedure changes the setting of the compression ratio in the engine 200. Namely the setting of the compression ratio in the engine 200 is kept unchanged in the case of a decrease in engine torque demand Tre required by the driver for only a short time. This arrangement effectively saves energy required for the frequent changeover of the compression ratio and thus enhances the total efficiency of the engine 200.

The procedure of the third embodiment changes over the compression ratio while keeping the ignition timing to the optimum timing at the high compression ratio, as shown in FIG. 11. One possible procedure changes the ignition timing simultaneously with the changeover of the compression ratio. The untimely change of the ignition timing relative to the changeover of the compression ratio by some reason may lead to the occurrence of knocking. The control procedure of this embodiment, however, changes over the compression ratio while keeping the ignition timing unchanged. This effectively prevents the occurrence of knocking in the process of changing over the compression ratio. The method of changing over the compression ratio under the condition of the fixed ignition timing causes the ignition timing to be deviated from the optimum timing in the course of the changeover and thereby decreases the output torque of the engine 200. The motor generator MG2 is thus controlled to supplement the deficiency of torque. Such control desirably keeps the driver of the vehicle free from the sense of discomfort.

Like the second embodiment, the control procedure of the third embodiment may take into account the state of charge of the battery 150. For example, when it is determined that the battery 150 has an insufficient state of charge, the control procedure may skip the processing of step S404 in the flowchart of FIG. 10 and immediately change over the setting of the compression ratio in the engine 200. The control procedure may alternatively set the timer to a significantly shorter time than the preset time dT at step S400. This arrangement desirably reduces the power consumption, when the battery 150 has the insufficient state of charge.

The embodiment discussed above and its modified examples are to be considered in all aspects as illustrative and not restrictive. There may be many other modifications, changes, and alterations without departing from the scope or spirit of the main characteristics of the present invention. For example, in the embodiments discussed above, the hybrid vehicle is the mechanical distribution hybrid vehicle with the planetary gear. The technique of the invention is also applicable to an electrical distribution hybrid vehicle.

Figure 12:
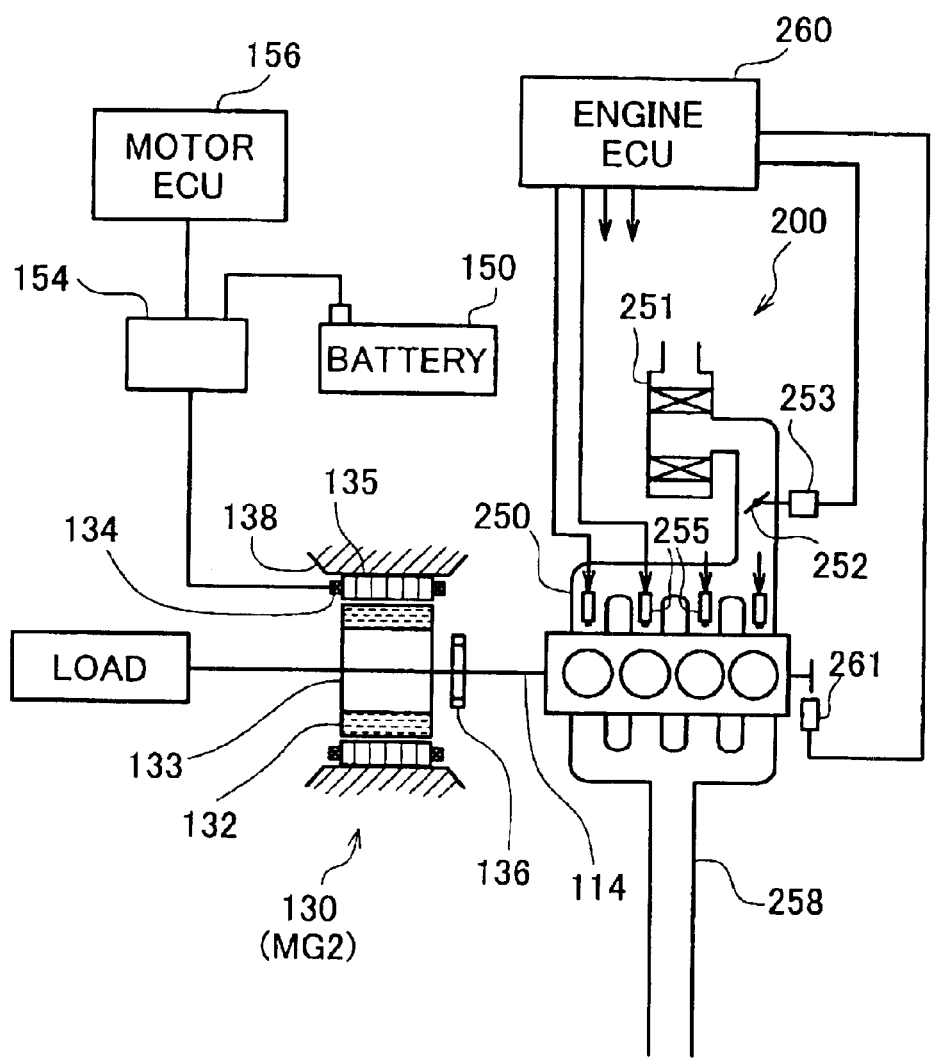
FIG. 12 conceptually illustrates a structure of utilizing the output of an internal combustion engine of the invention to drive a load.

In the embodiments discussed above, the internal combustion engine of the invention is mounted on the hybrid vehicle. The application of the internal combustion engine is, however, not restricted to the hybrid vehicle. For example, as shown in FIG. 12, the technique of the invention is effectively applied to a structure that utilizes the output of the internal combustion engine to drive any load.

The mechanism of changing over the setting of the compression ratio in the internal combustion engine is not restricted to the movement of the cylinder head 220 and the upper block 231 relative to the lower block 232 as shown in FIG. 3. Any of various known mechanisms may be adopted to change over the setting of the compression ratio in the internal combustion engine. One applicable mechanism adjusts the on-off timings of the intake valve 221 and the exhaust valve 222 to substantially change the setting of the compression ratio in the internal combustion engine.

The scope and spirit of the present invention are indicated by the appended claims, rather than by the foregoing description.

What is claimed is:

1. An internal combustion engine that is driven to output a required torque to an output shaft, said internal combustion engine comprising:

a compression mechanism that compresses an air-fuel mixture containing a fuel and the air taken into said internal combustion engine;

a compression ratio changeover mechanism that changes over a compression ratio of the air-fuel mixture compressed by said compression mechanism;

a motor transmits torque to and from said output shaft of said internal combustion engine;

a torque demand detection module that detects a torque demand, which is required to said output shaft of said internal combustion engine;

a specification module that compares the detected torque demand with a threshold torque, which is set in advance for changeover of setting of the compression ratio in said internal combustion engine, and distributes the torque demand into a first torque value to be transmitted between said motor and said output shaft and a second torque value to be output from said internal combustion engine based on a result of the comparison, said specification module specifying a desired setting of the compression ratio based on the result of the comparison;

a motor control module that controls said motor to regulate torque transmission between said motor and said output shaft according to the first torque value; and a driving module that controls said compression ratio changeover mechanism to change over setting of the compression ratio in said internal combustion engine according to the specification of the desired setting of the compression ratio.

2. An internal combustion engine in accordance with claim 1, wherein said specification module distributes the torque demand in such a manner as to reduce a frequent change of the torque division to be output from said internal combustion engine across the threshold torque, in response to a variation in detected torque demand.

3. An internal combustion engine in accordance with claim 1, wherein said specification module comprises a control area storage sub-module that stores a control area to specify setting of the compression ratio in said internal combustion engine and state of the first torque value, corresponding to at least the torque demand required to said output shaft, and said driving module comprises a driving instruction sub-module that gives at least an instruction of changing over the compression ratio to said compression ratio changeover mechanism and an instruction of torque transmission to said motor control module, according to the specification of the control area stored in said control area storage sub-module.

4. An internal combustion engine in accordance with claim 3, wherein said control area storage sub-module stores multiple control areas, which at least include:

a first control area to specify setting of a predetermined compression ratio in said internal combustion engine and selection of no torque as the first torque value, corresponding to a range of lower torque demand than the threshold torque, and a second control area to specify setting of the predetermined compression ratio in said internal combustion engine and selection of the first torque value, corresponding to a range of higher torque demand than the threshold torque, and said driving instruction sub-module gives the instruction of changing over the compression ratio to said compression ratio changeover mechanism and the instruction of torque transmission to said motor control module, according to the specification of the first control area or the specification of the second control area.

5. An internal combustion engine in accordance with claim 4, said internal combustion engine further comprising:

an accumulator module that accumulates electric power, which is to be supplied to said motor; and a power accumulation measurement module that measures an amount of power accumulation in said accumulator module, wherein said control area storage sub-module stores a third control area to specify setting of a lower compression ratio than the predetermined compression ratio in said internal combustion engine, corresponding to a range of higher torque demand than the torque demand range of the second control area, and when the observed amount of power accumulation is not greater than a preset threshold value, said driving instruction sub-module gives the instruction of changeover of the compression ratio and the instruction of torque transmission according to the specification of the third control area, in response to the detected torque demand even belonging to the second control area.

6. An internal combustion engine in accordance with claim 2, wherein said driving module comprises:

a time counting sub-module that counts elapse of a preset time after the detected torque demand exceeds the threshold torque; and a control sub-module that controls said motor control module to output an increased torque from said motor to said output shaft until the torque demand exceeding the threshold torque continues for the preset time, said control sub-module, when the torque demand exceeding the threshold torque continues for the preset time, changing over the setting of the compression ratio in said internal combustion engine to increase the output torque of said internal combustion engine, while controlling said motor control module to decrease the output torque from said motor to said output shaft.

7. An internal combustion engine in accordance with claim 6, said internal combustion engine further comprising:

an accumulator module that accumulates electric power, which is to be supplied to said motor; and a power accumulation measurement module that measures an amount of power accumulation in said accumulator module, wherein said driving module decreases the output torque from said motor to said output shaft before elapse of the preset time, when the observed amount of power accumulation is not greater than a preset threshold value.

8. An internal combustion engine with a variable compression ratio, said internal combustion engine comprising:

a compression mechanism that compresses an air-fuel mixture containing a fuel and the air taken into said internal combustion engine;

a compression ratio changeover mechanism that changes over a compression ratio of the air-fuel mixture compressed by said compression mechanism;

a motor that transmits torque to and from an output shaft of said internal combustion engine; and a motor control module that controls said motor in the course of changeover of the compression ratio set in said internal combustion engine by said compression ratio changeover mechanism and thereby reduces a variation in output torque of said internal combustion engine to be not greater than a predetermined level.

9. An internal combustion engine in accordance with claim 8, said internal combustion engine further comprising:

an internal combustion engine control module that controls a driving state of said internal combustion engine with setting of a control amount unchanged in the course of the changeover of the compression ratio, wherein the setting of the control amount is fixed to a specific control amount corresponding to the higher compression ratio between a previous compression ratio before the changeover and a new compression ratio after the changeover.

10. An internal combustion engine in accordance with claim 9, wherein said internal combustion engine control module, while the setting of the compression ratio in said internal combustion engine is changed over from a high compression ratio to a low compression ratio, controls the driving state of said internal combustion engine with the control amount kept to a specific control amount corresponding to the high compression ratio, and said motor control module regulates an output torque from said motor to said output shaft and thereby reduces the variation in output torque of said internal combustion engine, while the setting of the compression ratio in said internal combustion engine is changed over from the high compression ratio to the low compression ratio.

11. A control method of an internal combustion engine, which includes a motor that transmits torque to and from an output shaft of said internal combustion engine and a compression ratio changeover mechanism that changes over setting of a compression ratio of an air-fuel mixture in said internal combustion engine, said control method comprising the steps of:
detecting a torque demand, which is required to said output shaft of said internal combustion engine;
comparing the detected torque demand with a threshold torque, which is set in advance for changeover of setting of the compression ratio in said internal combustion engine;
distributing the torque demand into a first torque value to be transmitted between said motor and said output shaft and a second torque value to be output from said internal combustion engine based on a result of the comparison;
regulating the torque transmission between said motor and said output shaft according to the first torque value;
specifying a desired setting of the compression ratio based on the result of the comparison; and
controlling said compression ratio changeover mechanism to change over setting of the compression ratio in said internal combustion engine according to the specification of the desired setting of the compression ratio.

12. A control method in accordance with claim 11, said distributing step distributes the torque demand in such a manner as to reduce a frequent change of the torque division to be output from said internal combustion engine across the preset threshold torque, in response to a variation in detected torque demand.

13. A control method in accordance with claim 11, said control method further comprising the steps of:

storing a control area to specify setting of the compression ratio in said internal combustion engine and state of the first torque value, corresponding to at least the torque demand required to said output shaft; and giving an instruction to change over the compression ratio and control said motor according to the specification of the control area.

14. A control method in accordance with claim 13, wherein said storing step stores multiple control areas, which at least include:

a first control area to specify setting of a predetermined compression ratio in said internal combustion engine and selection of no torque as the first torque value, corresponding to a range of lower torque demand than the threshold torque, and a second control area to specify setting of the predetermined compression ratio in said internal combustion engine and selection of the first torque value, corresponding to a range of higher torque demand than the threshold torque, and said instruction-giving step gives an instruction to change over the compression ratio and control said motor according to the specification of the first control area or the specification of the second control area.

15. A control method in accordance with claim 14, said control method further comprising the steps of:

measuring an amount of power accumulation in an accumulator module, which supplies electric power to said motor;

storing a third control area to specify setting of a lower compression ratio than the predetermined compression ratio in said internal combustion engine, corresponding to a range of higher torque demand than the torque demand range of the second control area; and when the observed amount of power accumulation is not greater than a preset threshold value, giving an instruction to change over the compression ratio and control said motor according to the specification of the third control area, in response to the detected torque demand even belonging to the second control area.

16. A control method in accordance with claim 11, said control method further comprising the steps of:

counting elapse of a preset time after the detected torque demand exceeds the threshold torque;

controlling said motor to output an increased torque from said motor to said output shaft until the torque demand exceeding the threshold torque continues for the preset time; and when the torque demand exceeding the threshold torque continues for the preset time, changing over the setting of the compression ratio in said internal combustion engine to increase the output torque of said internal combustion engine, while controlling said motor to decrease the output torque from said motor to said output shaft.

17. A control method of an internal combustion engine, which includes a motor that transmits torque to and from an output shaft of said internal combustion engine and a compression ratio changeover mechanism that changes over setting of a compression ratio of an air-fuel mixture in said internal combustion engine, said control method comprising the step of:
controlling said motor in the course of changeover of the compression ratio set in said internal combustion engine by said compression ratio changeover mechanism and thereby reducing a variation in output torque of said internal combustion engine to be not greater than a predetermined level.

18. An internal combustion engine in accordance with claim 2, wherein said specification module comprises a control area storage sub-module that stores a control area to specify setting of the compression ratio in said internal combustion engine and state of the first torque value, corresponding to at least the torque demand required to said output shaft, and said driving module comprises a driving instruction sub-module that gives at least an instruction of changing over the compression ratio to said compression ratio changeover mechanism and an instruction of torque transmission to said motor control module, according to the specification of the control area stored in said control area storage sub-module.

19. A control method in accordance with claim 12, said control method further comprising the steps of:

storing a control area to specify setting of the compression ratio in said internal combustion engine and state of the first torque value, corresponding to at least the torque demand required to said output shaft; and giving an instruction to change over the compression ratio and control said motor according to the specification of the control area.

* * * * *